United States Patent
Malshe

(10) Patent No.: US 9,718,967 B2
(45) Date of Patent: *Aug. 1, 2017

(54) NANO-TRIBOLOGY COMPOSITIONS AND RELATED METHODS INCLUDING NANO-SHEETS

(71) Applicant: The Board of Trustees of the University of Arkansas, Little Rock, AR (US)

(72) Inventor: Ajay P. Malshe, Springdale, AR (US)

(*) Notice: Subject to any disclaimer, the term of this patent is extended or adjusted under 35 U.S.C. 154(b) by 245 days.

This patent is subject to a terminal disclaimer.

(21) Appl. No.: 14/173,369

(22) Filed: Feb. 5, 2014

(65) Prior Publication Data
US 2014/0212587 A1 Jul. 31, 2014

Related U.S. Application Data

(63) Continuation-in-part of application No. 13/921,640, filed on Jun. 19, 2013, now Pat. No. 9,499,766, which
(Continued)

(51) Int. Cl.
*C10M 169/04* (2006.01)
*C10M 169/00* (2006.01)
(Continued)

(52) U.S. Cl.
CPC .......... *C09D 7/1216* (2013.01); *B05D 3/007* (2013.01); *C10M 125/22* (2013.01);
(Continued)

(58) Field of Classification Search
CPC .... B05D 3/007; C09D 7/1216; C10M 125/22; C10M 171/06; C10M 171/00; C10M 2201/04; C10M 2201/041; C10M 2201/042; C10M 2201/06; C10M 2201/061; C10M 2201/062; C10M 2201/065; C10M 2201/066; C10M 2201/0663; C10M 2201/081;
(Continued)

(56) References Cited

U.S. PATENT DOCUMENTS 3,172,802 A 3/1965 Le Suer
3,666,662 A 5/1972 Lowe
(Continued)

FOREIGN PATENT DOCUMENTS

CN 1080648 1/1994
JP 63-040708 2/1988
(Continued)

OTHER PUBLICATIONS

Bakunin, V.N. et al., "Synthesis and application of inorganic nanoparticles as lubricant components—a review", J. Nanoparticle Res. (2004) 6:273-284.
(Continued)

*Primary Examiner* — Latosha Hines
(74) *Attorney, Agent, or Firm* — Akerman LLP; Stephen C. Glazier

(57) ABSTRACT

Compositions having a plurality of nanoparticles and nano-sheets are disclosed. Methods of making and using the compositions are also disclosed.

65 Claims, 15 Drawing Sheets

Related U.S. Application Data is a continuation of application No. 12/160,758, filed as application No. PCT/US2007/060506 on Jan. 12, 2007, now Pat. No. 8,492,319.

(60) Provisional application No. 60/758,307, filed on Jan. 12, 2006.

(51) Int. Cl.

| | | |
|---|---|---|
| C09D 7/12 | (2006.01) | |
| C10M 125/22 | (2006.01) | |
| B05D 3/00 | (2006.01) | |
| C10M 171/06 | (2006.01) | |
| C10M 177/00 | (2006.01) | |

(52) U.S. Cl.
CPC ........ *C10M 171/06* (2013.01); *C10M 177/00* (2013.01); *C10M 2201/04* (2013.01); *C10M 2201/041* (2013.01); *C10M 2201/042* (2013.01); *C10M 2201/06* (2013.01); *C10M 2201/061* (2013.01); *C10M 2201/062* (2013.01); *C10M 2201/065* (2013.01); *C10M 2201/066* (2013.01); *C10M 2201/0663* (2013.01); *C10M 2201/081* (2013.01); *C10M 2201/082* (2013.01); *C10M 2201/084* (2013.01); *C10M 2201/087* (2013.01); *C10M 2201/103* (2013.01); *C10M 2203/0206* (2013.01); *C10M 2203/1006* (2013.01); *C10M 2203/1025* (2013.01); *C10M 2205/163* (2013.01); *C10M 2207/0406* (2013.01); *C10M 2207/1285* (2013.01); *C10M 2207/2815* (2013.01); *C10M 2207/2835* (2013.01); *C10M 2207/401* (2013.01); *C10M 2213/046* (2013.01); *C10M 2213/062* (2013.01); *C10M 2215/0813* (2013.01); *C10M 2223/10* (2013.01); *C10M 2223/103* (2013.01); *C10M 2229/025* (2013.01); *C10N 2210/02* (2013.01); *C10N 2210/03* (2013.01); *C10N 2210/04* (2013.01); *C10N 2210/08* (2013.01); *C10N 2220/082* (2013.01); *C10N 2230/56* (2013.01); *C10N 2250/10* (2013.01); *C10N 2250/14* (2013.01); *C10N 2270/00* (2013.01)

(58) Field of Classification Search
CPC ...... C10M 2201/082; C10M 2201/084; C10M 2201/087; C10M 2203/0206; C10M 2203/1006; C10M 2203/1025; C10M 2205/163; C10M 2207/0406; C10M 2207/285; C10N 2210/02; C10N 2210/03; C10N 2210/04; C10N 2210/08; C10N 2210/082; C10N 2230/56; C10N 2250/14; C10N 2270/00
USPC .......................... 508/154, 155, 161, 162, 165
See application file for complete search history.

(56) References Cited

U.S. PATENT DOCUMENTS

| | | |
|---|---|---|
| 3,883,314 A | 5/1975 | Schnyder et al. |
| 4,105,571 A | 8/1978 | Shaub et al. |
| 4,168,241 A | 9/1979 | Kozima et al. |
| 4,223,958 A | 9/1980 | Gray |
| 4,334,928 A | 6/1982 | Hara et al. |
| 4,715,972 A | 12/1987 | Pacholke |
| 4,745,010 A | 5/1988 | Sarin et al. |
| 4,816,334 A | 3/1989 | Yokoyama et al. |
| 4,877,677 A | 10/1989 | Hirochi et al. |
| 5,129,918 A | 7/1992 | Chattopadhay |
| 5,273,790 A | 12/1993 | Herb et al. |
| 5,286,565 A | 2/1994 | Holzl et al. |
| 5,328,875 A | 7/1994 | Ueda et al. |
| 5,330,854 A | 7/1994 | Singh et al. |
| 5,352,501 A | 10/1994 | Miyamoto et al. |
| 5,363,821 A | 11/1994 | Rao et al. |
| 5,389,118 A | 2/1995 | Hinterman et al. |
| 5,391,422 A | 2/1995 | Omori et al. |
| 5,407,464 A | 4/1995 | Kaliski |
| 5,441,762 A | 8/1995 | Gray et al. |
| 5,466,642 A | 11/1995 | Tajima et al. |
| 5,478,622 A | 12/1995 | Nakamura et al. |
| 5,500,331 A | 3/1996 | Czekai et al. |
| 5,503,913 A | 4/1996 | Konig et al. |
| 5,523,006 A | 6/1996 | Strumban |
| 5,534,808 A | 7/1996 | Takaki et al. |
| 5,536,577 A | 7/1996 | Murayama et al. |
| 5,614,140 A | 3/1997 | Pinneo |
| 5,671,532 A | 9/1997 | Rao et al. |
| 5,677,060 A | 10/1997 | Terentieva et al. |
| 5,704,556 A | 1/1998 | McLaughlin |
| 5,766,783 A | 6/1998 | Utsumi et al. |
| 5,800,866 A | 9/1998 | Myers et al. |
| 5,830,577 A | 11/1998 | Murayama et al. |
| 5,830,813 A | 11/1998 | Yao et al. |
| 5,834,689 A | 11/1998 | Cook |
| 5,882,777 A | 3/1999 | Kukino et al. |
| 5,889,219 A | 3/1999 | Moriguchi et al. |
| 5,897,751 A | 4/1999 | Makowiecki et al. |
| 5,902,671 A | 5/1999 | Kutscher |
| 5,928,771 A | 7/1999 | DeWald, Jr. et al. |
| 5,945,166 A | 8/1999 | Singh et al. |
| 6,123,923 A | 9/2000 | Unger et al. |
| 6,146,645 A | 11/2000 | Deckers et al. |
| 6,183,762 B1 | 2/2001 | Deckers et al. |
| 6,196,910 B1 | 3/2001 | Johnson et al. |
| 6,210,742 B1 | 4/2001 | Deckers et al. |
| 6,217,843 B1 | 4/2001 | Homyonfer et al. |
| 6,258,139 B1 | 7/2001 | Jensen |
| 6,258,237 B1 | 7/2001 | Gal-Or et al. |
| 6,267,989 B1 * | 7/2001 | Liversidge ............ A61K 9/146 424/489 |
| 6,370,762 B1 | 4/2002 | Li et al. |
| 6,372,012 B1 | 4/2002 | Majagi et al. |
| 6,383,404 B1 | 5/2002 | Sakai et al. |
| 6,395,634 B1 | 5/2002 | Miyamoto |
| 6,410,086 B1 | 6/2002 | Brandon et al. |
| 6,484,826 B1 | 11/2002 | Anderson et al. |
| 6,540,800 B2 | 4/2003 | Sherman et al. |
| 6,544,599 B1 | 4/2003 | Brown et al. |
| 6,548,139 B2 | 4/2003 | Sakai et al. |
| 6,548,264 B1 | 4/2003 | Tan et al. |
| 6,607,782 B1 | 8/2003 | Malshe et al. |
| 6,652,967 B2 | 11/2003 | Yadav et al. |
| 6,709,622 B2 | 3/2004 | Billiet et al. |
| 6,710,020 B2 | 3/2004 | Tenne et al. |
| 6,878,676 B1 | 4/2005 | Migdal et al. |
| 6,895,855 B2 | 5/2005 | Doll |
| 6,933,049 B2 | 8/2005 | Wan et al. |
| 6,933,263 B2 | 8/2005 | Manka et al. |
| 6,945,699 B2 | 9/2005 | Tibbits |
| 6,951,583 B2 | 10/2005 | Clere et al. |
| 6,962,895 B2 | 11/2005 | Scharf et al. |
| 6,962,946 B2 | 11/2005 | Brady et al. |
| 6,976,647 B2 | 12/2005 | Reed et al. |
| 7,018,606 B2 | 3/2006 | Tenne et al. |
| 7,018,958 B2 | 3/2006 | Arrowsmith et al. |
| 7,022,653 B2 | 4/2006 | Hartley et al. |
| 7,244,498 B2 | 7/2007 | Cook et al. |
| 7,335,245 B2 | 2/2008 | He et al. |
| 7,371,474 B1 | 5/2008 | Liu et al. |
| 7,372,615 B2 | 5/2008 | Chen et al. |
| 7,374,473 B2 | 5/2008 | Kumasaka et al. |
| 7,375,060 B2 | 5/2008 | Kuzmin et al. |
| 7,387,813 B2 | 6/2008 | Kumar et al. |
| 7,410,697 B2 | 8/2008 | Schneider et al. |
| 7,419,941 B2 | 9/2008 | Waynick |
| 7,430,359 B2 | 9/2008 | Chen et al. |
| 7,438,976 B2 | 10/2008 | He et al. |
| 7,449,432 B2 | 11/2008 | Lockwood et al. |

(56) References Cited

U.S. PATENT DOCUMENTS

| | | | |
|---|---|---|---|
| 7,458,384 B1 | 12/2008 | Seal et al. |
| 7,463,404 B2 | 12/2008 | Chen et al. |
| 7,470,650 B2 | 12/2008 | Zhang et al. |
| 7,471,439 B2 | 12/2008 | Chen et al. |
| 7,494,907 B2 | 2/2009 | Brown et al. |
| 7,510,760 B2 | 3/2009 | Malshe et al. |
| 7,524,481 B2 | 4/2009 | Tenne et al. |
| 7,549,938 B2 | 6/2009 | Leighton et al. |
| 7,556,743 B2 | 7/2009 | Furman et al. |
| 7,571,774 B2 | 8/2009 | Shuster et al. |
| 7,580,174 B2 | 8/2009 | Chen et al. |
| 7,594,962 B2 | 9/2009 | Bujard et al. |
| 7,597,950 B1 | 10/2009 | Stellacci et al. |
| 7,614,270 B2 | 11/2009 | Luckey, Jr. et al. |
| 7,616,370 B2 | 11/2009 | Chen et al. |
| 7,641,886 B2 | 1/2010 | Tenne et al. |
| 7,687,112 B2 | 3/2010 | Buehler et al. |
| 7,704,125 B2 | 4/2010 | Roy et al. |
| 7,723,812 B2 | 5/2010 | Chen et al. |
| 7,749,562 B1 | 7/2010 | Lam et al. |
| 7,763,489 B2 | 7/2010 | Chen et al. |
| 7,767,632 B2 | 8/2010 | Esche, Jr. et al. |
| 7,768,366 B1 | 8/2010 | Patton et al. |
| 7,771,821 B2 | 8/2010 | Martin et al. |
| 7,790,658 B2 | 9/2010 | Sawyer et al. |
| 7,803,347 B2 | 9/2010 | Ajiri |
| 7,816,297 B2 | 10/2010 | Lee |
| 7,846,556 B2 | 12/2010 | Erdemir et al. |
| 7,871,533 B1 | 1/2011 | Haiping et al. |
| 7,952,786 B2 | 5/2011 | Chen et al. |
| 7,955,857 B2 | 6/2011 | Bastide et al. |
| 7,959,891 B2 | 6/2011 | Tenne et al. |
| 7,968,505 B2 | 6/2011 | Liu et al. |
| 7,994,105 B2 | 8/2011 | Narayan |
| 7,998,572 B2 | 8/2011 | McGilvray et al. |
| 8,048,526 B2 | 11/2011 | Mizrahi |
| 8,071,160 B2 | 12/2011 | Chinn et al. |
| 8,074,906 B2 | 12/2011 | Talton |
| 8,075,792 B1 | 12/2011 | Branz et al. |
| 8,076,809 B2 | 12/2011 | Tingler et al. |
| 8,114,373 B2 | 2/2012 | Jang et al. |
| 8,117,902 B2 | 2/2012 | Santore et al. |
| 8,221,828 B2 | 7/2012 | Chinn et al. |
| 8,322,754 B2 | 12/2012 | Carcagno et al. |
| 8,476,206 B1 | 7/2013 | Malshe |
| 8,486,870 B1 | 7/2013 | Malshe |
| 8,492,319 B2 | 7/2013 | Malshe et al. |
| 2005/0002970 A1 | 1/2005 | Ketelson et al. |
| 2005/0065044 A1 | 3/2005 | Migdal et al. |
| 2005/0124504 A1 | 6/2005 | Zhang et al. |
| 2005/0191357 A1 | 9/2005 | Kawashima et al. |
| 2005/0287348 A1* | 12/2005 | Faler ............... B32B 5/18 428/315.5 |
| 2005/0288192 A1* | 12/2005 | Alexander ............ B01J 13/0065 508/287 |
| 2006/0025515 A1 | 2/2006 | Scaringe et al. |
| 2006/0056752 A1 | 3/2006 | Tibbits |
| 2006/0120947 A1 | 6/2006 | Tenne et al. |
| 2006/0258875 A1 | 11/2006 | Reyes et al. |
| 2007/0004602 A1 | 1/2007 | Waynick |
| 2007/0158609 A1 | 7/2007 | Hong et al. |
| 2007/0158610 A1 | 7/2007 | Hong et al. |
| 2007/0262120 A1 | 11/2007 | Coleman et al. |
| 2007/0293405 A1 | 12/2007 | Zhang et al. |
| 2008/0029625 A1 | 2/2008 | Talton |
| 2008/0050450 A1 | 2/2008 | Arnold et al. |
| 2008/0066375 A1 | 3/2008 | Roos et al. |
| 2008/0161213 A1 | 7/2008 | Jao et al. |
| 2008/0234149 A1 | 9/2008 | Malshe et al. |
| 2008/0269086 A1 | 10/2008 | Adhvaryu |
| 2008/0287326 A1 | 11/2008 | Zhang et al. |
| 2009/0014691 A1 | 1/2009 | Kint et al. |
| 2009/0018037 A1 | 1/2009 | Mabuchi et al. |
| 2009/0042751 A1 | 2/2009 | Narayan |
| 2009/0048129 A1 | 2/2009 | Mabuchi et al. |
| 2009/0053268 A1 | 2/2009 | DePablo et al. |
| 2009/0074522 A1 | 3/2009 | Graham et al. |
| 2009/0118148 A1 | 5/2009 | Martin et al. |
| 2009/0155479 A1 | 6/2009 | Xiao et al. |
| 2009/0169745 A1 | 7/2009 | Nohr et al. |
| 2009/0170733 A1 | 7/2009 | Hwang et al. |
| 2009/0246285 A1 | 10/2009 | Stellacci et al. |
| 2010/0029518 A1 | 2/2010 | Markovitz et al. |
| 2010/0092663 A1 | 4/2010 | Ajiri |
| 2010/0099590 A1 | 4/2010 | Liu |
| 2010/0112073 A1 | 5/2010 | Sabliov et al. |
| 2010/0204072 A1 | 8/2010 | Kwon et al. |
| 2010/0227782 A1 | 9/2010 | Tenne et al. |
| 2010/0261625 A1 | 10/2010 | Hakamata |
| 2010/0298180 A1 | 11/2010 | Patel et al. |
| 2011/0052934 A1 | 3/2011 | Sugimoto et al. |
| 2011/0118156 A1 | 5/2011 | Ruhle et al. |
| 2011/0136708 A1 | 6/2011 | Mabuchi et al. |
| 2011/0166051 A1 | 7/2011 | Mizrahi et al. |
| 2011/0172132 A1 | 7/2011 | Branson et al. |
| 2011/0206596 A1 | 8/2011 | Tenne et al. |
| 2011/0229580 A1 | 9/2011 | Srivastava et al. |
| 2011/0244692 A1 | 10/2011 | Jeong et al. |
| 2011/0257054 A1 | 10/2011 | Baran, Jr. et al. |
| 2011/0287987 A1 | 11/2011 | Mordukhovich et al. |
| 2012/0032543 A1 | 2/2012 | Chakraborty et al. |
| 2014/0024565 A1 | 1/2014 | Malshe et al. |
| 2014/0038862 A1 | 2/2014 | Hague et al. |
| 2014/0364348 A1 | 12/2014 | Malshe |
| 2015/0132539 A1 | 5/2015 | Bailey |
| 2015/0361375 A1 | 12/2015 | Malshe et al. |

FOREIGN PATENT DOCUMENTS

| | | | |
|---|---|---|---|
| JP | 10130678 A | 5/1998 | |
| JP | 10195473 A | 7/1998 | |
| JP | 10330779 A | 12/1998 | |
| JP | 2002-294272 | 10/2002 | |
| JP | 2006-045350 | 2/2006 | |
| WO | WO 95/02025 A1 | 1/1995 | |
| WO | WO 98/24833 A1 | 6/1998 | |
| WO | WO 2005/060648 | 7/2005 | |
| WO | WO 2005060648 A2 * | 7/2005 | .......... C10M 125/02 |
| WO | WO 2006/076728 | 7/2006 | |
| WO | WO 2006/134061 | 12/2006 | |
| WO | WO 2007/082299 | 7/2007 | |
| WO | WO 2014/008006 | 1/2014 | |

OTHER PUBLICATIONS

Dmytryshyn, S.L., et al., "Synthesis and characterization of vegetable oil derived esters: evaluation for their diesel additive properties", Bioresource Tech. (2004) 92:55-64.

Hsu, S.M., et al., "Boundary lubricating films: formation and lubrication mechanism", Tribology Int'l (2005) 38:305-312.

Hu, J.J. et al., "Synthesis and microstructural characterization of inorganic fullerene-like MoS2 and graphite-MoS2 hybrid nanoparticles", J. Mater. Res. (2006) 21(4):1033-1040.

Jiang, W. et al., "Cubic boron nitride (cBN) based nanocomposite coatings on cutting inserts with chip breakers for hard turning applications", Surface & Coatings Technology (2005) 200:1849-1854.

Li, B. et al., "Tribochemistry and antiwear mechanism of organic-inorganic nanoparticles as lubricant additives", Technology Letters (2006) 22(1):79-84.

Malshe, A.P. et al., "Nanostructured coatings for machining and wear-resistant applications", JOM (2002) 28-30.

Menezes, P.L. et al., "Studies on friction and transfer layer: role of surface texture", Tribology Letter (2006) 24(3):265-273.

Minami, I. et al., "Antiwear properties of phosphorous-containing compounds in vegetable oils", Tribology Letter (2002) 13(2):95-101.

Moshkovith, A. et al., "Friction of fullerene-like WS2 nanoparticles; effect of agglomeration", Tribology Letter (2006) 24(3):225-228.

(56) References Cited

OTHER PUBLICATIONS

Ozkan et al., "Femtosecond laser-induced periodic structure writing on diamond crystals and microclusters", Applied Physics Letters, vol. 75, No. 23, Dec. 6, 1999, pp. 3716-3718.
Rao, C.N.R. et al "Inorganic nanotubes", Dalton Trans. (2003) 1-24.
Russell, W.C. et al., "CBN-TiN composite coating using a novel combinatorial method—structure and performance in metal cutting", J. Mfg. Sci. Eng. (2003) 125:431-434.
Spikes, H., The thickness, friction and wear of lubricant files, a PowerPoint presentation given at the SAE Powertrain & Fluid Systems Conference and Exhibition, San Antonio, Texas (Oct. 25, 2005).
Verma, A. et al., "Exploring mechanical synthesis of inorganic nanoparticles of MoS2 lubricant and its composite with organic medium for advanced manufacturing", ISNM (2006) Paper No. 33.
Wu, J.-H. et al., "Bio-inspired surface engineering and tribology of MoS2 overcoated cBN-TiN composite coating", Wear (2006) 261(5-6):592-599.
Yedave, S.N. et al., "Novel composite CBN-TiN coating; synthesis and performance analysis", J. Mfg. Processes (2003) 5(2):154-162.
Spalvins, T. "A review of recent advances in solid film lubrication", J. Vac. Sci. Technol/ A (1987) 5(2):212-219.
Canter, Dr. Neil, "EP nanoparticles-based lubricant package", Tribology & Lubrication Technology, Apr. 2009, pp. 12-17.
Demydov, Ph.D., Dmytro, "Progress Report (2nd Quarter) Advanced Lubrication for Energy Efficiency, Durability and Lower Maintenance Costs of Advanced Naval Components and Systems", NanoMech, LLC, prepared for Office of Naval Research for the period of Feb. 20, 2010-May 19, 2010, 34 pages.
Verma et al., "Tribological Behavior of Deagglomerated Active Inorganic Nanoparticles for Advanced Lubrication", Tribology Transactions, Sep. 1, 2008, 51: pp. 673-678.
Adhvaryu, Dr. Antanu, "Multi-component Nanoparticle Based Lubricant Additive to Improve Efficiency and Durability in Engines", Caterpillar Inc., Aug. 7, 2008, 27 pages.
Verma, Arpana, "Fundamental Understanding of the Synthesis and Tribological Behavior of Organic-Inorganic Nanoparticles", Dec. 2008, University of Arkansas, 147 pages.
Berdinsky et al., "Synthesis of MoS2 nanostructures from nano-size powder by thermal annealing", Electron Devices and Materials (2000), EDM (2000) Siberian Russian Student Workshops on Sep. 19-21, 2000, Piscataway, NJ, USA, pp. 20-28.
Cizaire et al., "Mechanisms of ultra-low friction by hollow inorganic fullerene-like MoS2 nanoparticles", Surface and Coatings Technology (2002) 160(2-3): pp. 282-287.
Huang et al., "Friction and wear properties of IF-MOS2 as additive in Paraffin oil," Tribology Letters, vol. 20, Nos. 3-4, Dec. 2005, pp. 247-250.
Rapoport et al., "Fullerene-like WS2 nanoparticles: superior lubricants for harsh conditions", Advanced Materials, Apr. 17, 2003, vol. 15, Nos. 7-8, pp. 651-655.
Hu, Xianguo, "On the size effect of molybdenum disulfide particles on tribological performance", Industrial Lubrication and Tribology, 2005, vol. 57, Issue 6, pp. 255-259.
JP Patent Office, Office Action dated May 25, 2015, from JP Patent Application No. 2014-095260 (with English Translation).
Gustavsoon et al., Nanoparticle based and sputtered WS2 low-friction coatings—Differences and similarities with respect to friction mechanisms and tribofilm formulation, Surface and Coating Technology, vol. 232, pp. 616-626, Oct. 15, 2013.
International Bureau of WIPO, International Preliminary Report on Patentability, for PCT/US2014/071886, mailed Aug. 18, 2016.
International Search Report, issued on Oct. 16, 2015 in PCT/US15/27925.
USPTO Office Action for U.S. Appl. No. 11/074,597, dated Mar. 20, 2008.
USPTO Office Action for U.S. Appl. No. 11/074,597, dated Aug. 23, 2007.
USPTO Office Action for U.S. Appl. No. 11/074,597, dated Jan. 31, 2007.
USPTO Office Action for U.S. Appl. No. 12/007,555, dated Jan. 12, 2010.
USPTO Office Action for U.S. Appl. No. 12/007,555, dated Oct. 4, 2012.
Supplemental European Extended Search Report and Search Opinion for European Patent Application No. 07710113.7, dated Sep. 20, 2012.
English translation of Japanese Office Action for Application No. 2008-550538, dated Sep. 20, 2012.
U.S. Appl. No. 14/844,797, filed Sep. 3, 2015.

\* cited by examiner

NANO-TRIBOLOGY COMPOSITIONS AND RELATED METHODS INCLUDING NANO-SHEETS

CROSS-REFERENCE TO RELATED APPLICATIONS

This patent application is a continuation-in-part application and claims the benefit of the filing date under 35 U.S.C. §120 of U.S. patent application Ser. No. 13/921,640, filed on Jun. 19, 2013. U.S. patent application Ser. No. 13/921,640 is a continuation application and claims the benefit of the filing date under 35 U.S.C. §120 of U.S. patent application Ser. No. 12/160,758, filed on Sep. 2, 2008, now U.S. Pat. No. 8,492,319, issued Jul. 23, 2013. U.S. patent application Ser. No. 12/160,758 is a national stage filing under 35 U.S.C. §371 and claims priority to International Application No. PCT/US2007/060506, filed on Jan. 12, 2007. International Application No. PCT/US2007/060506 claims priority under 35 U.S.C. §119(e) to U.S. Provisional Patent Application No. 60/758,307, filed on Jan. 12, 2006. U.S. patent application Ser. Nos. 13/921,640; 12/160,758; and 60/758,307; and International Application No. PCT/US2007/060506 are incorporated by reference into this specification.

TECHNICAL FIELD

This specification relates to compositions and methods in the field of tribology, solid surface engineering, lubrication, wear, and related functions such as corrosion resistance, catalysis, and the like. This specification also relates to compositions and methods in the sub-field of nano-tribology and associated solid surface nano-engineering, nano-lubrication, and nano-wear.

BACKGROUND

Tribology refers to the science and engineering of solid surfaces. Tribology includes the study and application of surface chemistry and structure, friction, lubrication, corrosion, and wear. The tribological interactions of a solid surface with interfacing materials and the surrounding environment may result in the loss of material from the surface in processes generally referred to as "wear." Major types of wear include abrasion, friction (adhesion and cohesion), erosion, and corrosion. Wear may be reduced by the use of lubricants and/or other anti-wear agents. Wear may also be reduced by modifying the surface properties of solids using one or more "surface engineering" processes (i.e., modifying the chemical and/or structural properties of solid surfaces).

SUMMARY

In a non-limiting embodiment, a composition comprises a plurality of nanoparticles having open architecture, a plurality of multifunctional nano-sheets, and an organic medium intercalating the nanoparticles.

In another non-limiting embodiment, a method comprises contacting a surface with a composition. The composition comprises a plurality of nanoparticles having open architecture and an organic medium intercalated in the nanoparticles. The surface and the contacting composition are subjected to a frictional force. Constituent layers of the nanoparticles are delaminated to form a plurality of multifunctional nano-sheets. The nano-sheets deposit on the surface in a tribo-film.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which:

FIG. 3(A) shows molybdenum disulfide as it is available, typically from about a few microns to submicron size; FIG. 3(B) shows molybdenum disulfide that has been ball milled in air for 48 hours; FIG. 3(C) is a high resolution electron microscopy image that shows molybdenum disulfide that has been ball milled in air for 48 hours; FIG. 3(D) is a high-resolution transmission electron microscopy (HRTEM) image that shows molybdenum disulfide that has been ball milled in air for 48 hours followed by ball milling in oil for 48 hours;

FIG. 4(A) is the XRD spectra for molybdenum disulfide that has been ball milled in air for 48 hours followed by ball milling in oil for 48 hours; FIG. 4(B) is the XRD spectra for molybdenum disulfide that has been ball milled in air for 48 hours; FIG. 4(C) is the XRD spectra for molybdenum disulfide that has not been ball milled;

FIG. 6(A) shows the average wear scar diameter for a base oil (paraffin oil), paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours; FIG. 6(B) shows the load wear index for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours; FIG. 6(C) shows the coefficient of friction for paraffin oil without a nanoparticle additive, paraffin oil with micron sized $MoS_2$ (c-$MoS_2$), paraffin oil with $MoS_2$ that was milled in air for 48 hours (d-$MoS_2$), and paraffin oil with $MoS_2$ that was milled in air for 48 hours followed by milling in canola oil for 48 hours (n-$MoS_2$); FIG. 6(D) shows the extreme pressure data for paraffin oil with micron sized $MoS_2$ (c-$MoS_2$), paraffin oil with $MoS_2$ that was milled in air for 48 hours (d-$MoS_2$), and paraffin oil with $MoS_2$ that was milled in air for 48 hours followed by milling in canola oil for 48 hours (n-$MoS_2$); in each test the lubricant nanoparticle additive was present in the amount of 1% by weight;

FIG. 7(A) shows the close caged dense oval shaped architecture of molybdenum disulfide nanoparticles that have been ball milled in air for 48 hours; FIG. 7(B) shows the open ended oval shaped architecture of molybdenum disulfide nanoparticles that have been ball milled in air for 48 hours followed by ball milling in canola oil for 48 hours;

FIG. 9(A) shows paraffin oil without any nanoparticle composition additive; FIG. 9(B) shows paraffin oil with molybdenum disulfide nanoparticles that have been ball milled in air for 48 hours followed by ball milling in oil for 48 hours and treated with a phospholipid emulsifier.

Figure 1:
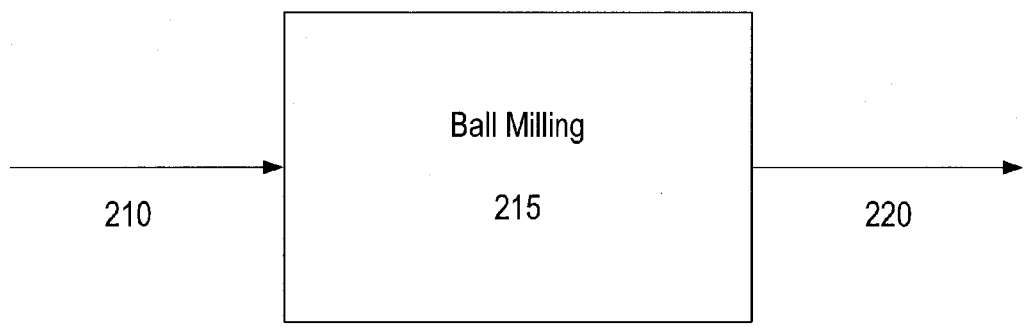
FIG. 1 is a diagram illustrating a method of producing nanoparticles.

The reader will appreciate the foregoing details, as well as others, upon considering the following detailed description of various non-limiting and non-exhaustive embodiments according to this specification.

DESCRIPTION

Various embodiments are described and illustrated in this specification to provide an overall understanding of the function, operation, and implementation of the disclosed compositions and methods. It is understood that the various embodiments described and illustrated in this specification are non-limiting and non-exhaustive. Thus, the invention is not necessarily limited by the description of the various non-limiting and non-exhaustive embodiments disclosed in this specification. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §§112(a) and 132(a). The various embodiments disclosed and described in this specification can comprise, consist of, or consist essentially of the features and characteristics as variously described in this specification.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited in this specification. All such ranges are intended to be inherently described in this specification such that amending to expressly recite any such sub-ranges would comply with the requirements of 35 U.S.C. §§112(a) and 132(a).

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference into this specification. Any material, or portion thereof, that is said to be incorporated by reference into this specification, but which conflicts with existing definitions, statements, or other disclosure material set forth in this specification, is only incorporated to the extent that no conflict arises between that incorporated material and the existing disclosure material. Applicants reserve the right to amend this specification to expressly recite any subject matter, or portion thereof, incorporated by reference into this specification.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The compositions and methods described in this specification may comprise, among other components, nanoparticles and/or nano-sheets.

The nanoparticles may comprise a transition metal chalcogenide compound, including sulfides, selenides, and tellurides or one or more element such as, for example, titanium, zirconium, hafnium, vanadium, niobium, tantalum, chromium, molybdenum, or tungsten. The nanoparticles may comprise a chalcogenide material such as, for example, molybdenum disulfide, tungsten disulfide, niobium diselenide, and/or other materials such as, for example, hexagonal boron nitride, graphite, metals such as copper or silver, inorganic compounds such as calcium carbonate, polymers such as polytetrafluoroethylene (PTFE), or dithiophosphate compounds. The compositions described in this specification may therefore comprise, among others, molybdenum disulfide nanoparticles, tungsten disulfide nanoparticles, niobium diselenide nanoparticles, hexagonal boron nitride nanoparticles, graphite nanoparticles, copper nanoparticles, silver nanoparticles, calcium carbonate nanoparticles, PTFE nanoparticles, nanoparticles of dithiophosphate compounds, or combinations of any thereof.

In various embodiments, the nanoparticles may have an open architecture. As used in this specification, the term "open architecture" or "open-ended architecture" refers to the morphology of particles comprising fissures, separations, or other discontinuities in the particles' outer surfaces which provide openings to the internal portions of the individual particles. In embodiments comprising layered particles, the terms "open architecture" or "open-ended architecture" refer to the morphology of the layered particles comprising inter-layer defects (e.g., shearing, buckling, folding, curling, and dislocating of constituent molecular layers) at the surface of the particles, which increase the inter-planar spacing between groupings of molecular layers, thereby providing fissures, separations, or other discontinuities in the particles' outer surfaces and openings to the internal portions of the particles. As used in this specification, the term "layered particles" or "layered nanoparticles" refers to particles comprising generally parallel stacked molecular layers, wherein the inter-layer bonding comprises relatively weak bonding such van der Waals bonding, and wherein the intra-layer bonding comprises relatively strong bonding such as covalent bonding. Examples of layered particles include, but are not limited to, graphite particles, molybdenum disulfide particles, tungsten disulfide particles, niobium diselenide particles, and hexagonal boron nitride particles. It is understood that the terms "open architecture" and "open-ended architecture" exclude particle morphologies such as nano-tubes and fullerenes, which are characterized by closed particle surfaces lacking fissures, separations, or other discontinuities in the particles' outer surfaces.

The compositions described in this specification may also comprise an organic medium encapsulating/coating the nanoparticles and/or intercalated in the nanoparticles. For example, an organic medium may be integrated into the internal portions of individual nanoparticles by intercalating into the spaces formed by the fissures, separations, or other discontinuities in the outer surfaces of nanoparticles having an open architecture. In various embodiments, the nanoparticles may be intercalated and encapsulated/coated with an organic medium.

The nanoparticles may have an average primary particle size of less than or equal to 1000 nanometers, and in some embodiments, less than or equal to 500 nanometers, less than or equal to 400 nanometers, less than or equal to 300 nanometers, less than or equal to 200 nanometers, less than or equal to 100 nanometers, less than or equal to 75 nanometers, less than or equal to 50 nanometers, or less than or equal to 25 nanometers.

As used in this specification, including the claims, the term "average primary particle size" refers to a particle size as determined by visually examining a microscopy image of a sample of particles, measuring the largest length dimension of the individual particles in the image (i.e., the diameters of the smallest spheres that completely surround the individual particles in the image), and calculating the average of the length dimensions (diameters) based on the magnification of the image. A person having ordinary skill in the art will understand how to prepare a microscopy image (e.g., light microscopy, transmission electron microscopy, and the like) of the particles comprising a composition and determine the average primary particle size of constituent particles (or a subset of the constituent particles based on like particle composition) based on the magnification of the microscopy image. As used in this specification, the term "average primary particle size" refers the size of individual particles as opposed to agglomerations of two or more individual particles.

As described above, the compositions and methods described in this specification may comprise, among other components, nanoparticles and/or nano-sheets. As used in this specification, including the claims, the term "nano-sheets" refers to planar-shaped particles having a thickness dimension of less than 500 nanometers and an aspect ratio (defined as the ratio of the largest length/width dimension to the thickness dimension) of at least 2. In some embodiments, for example, nano-sheets may have a thickness dimension of less than 100 nanometers and an aspect ratio of at least 10. Nano-sheets may have a thickness dimension of less than 50 nanometers and an aspect ratio of at least 20. Nano-sheets may have a thickness dimension of less than 25 nanometers and an aspect ratio of at least 40. Nano-sheets may have a thickness dimension of less than 10 nanometers and an aspect ratio of at least 100. Nano-sheets may have a thickness dimension corresponding to approximately one unit cell dimension and such nano-sheets may be referred to as molecular nano-sheets. Nano-sheets may have length and width dimensions of less than 1000 nanometers.

Molecular nano-sheets are a sub-genus of nano-sheets in which the thickness dimensions of the nano-sheets correspond to approximately one unit cell dimension. Molecular nano-sheets may be, but are not necessarily, crystalline molecular structures. In some embodiments, molecular nano-sheets may have length and width dimensions of less than or equal to 1000 nanometers, 500 nanometers, or 100 nanometers. In some embodiments, molecular nano-sheets may have a thickness dimension corresponding to approximately one unit cell dimension. Generally, a molecular nano-sheet may comprise a single layer of any layered nanoparticle (e.g., a graphite/graphene molecular nano-sheet, a molybdenum disulfide molecular nano-sheet, a tungsten disulfide molecular nano-sheet, a niobium diselenide molecular nano-sheet, or a hexagonal boron nitride molecular nano-sheet).

The crystal structure of a material (i.e., the spatial arrangement of the atoms forming a crystal) can be described in terms of the unit cell. A unit cell is the smallest molecular unit that a crystal can be divided into using crystallographic symmetry operations. In other words, a unit cell is the simplest repeating unit in a crystalline material. Unit cells stacked in three-dimensional space describe the bulk arrangement of atoms of a crystalline material.

By way of example, molybdenum disulfide predominantly exists in a hexagonal crystal form characterized by $MoS_2$ layers in which the molybdenum atoms have trigonal prismatic coordination of six sulfur atoms with two molecules per unit cell. Thus, the molybdenum disulfide crystal structure comprises a tri-layer having one planar hexagonal layer of molybdenum atoms interspersed between two planar layers of sulfur atoms forming an intra-molecular covalently bonded S—Mo—S molecular layer. Bulk molybdenum disulfide comprises relatively weak inter-molecular van der Waals bonds between the adjacent sulfur atoms of stacked S—Mo—S molecular layers.

Figure 10A:
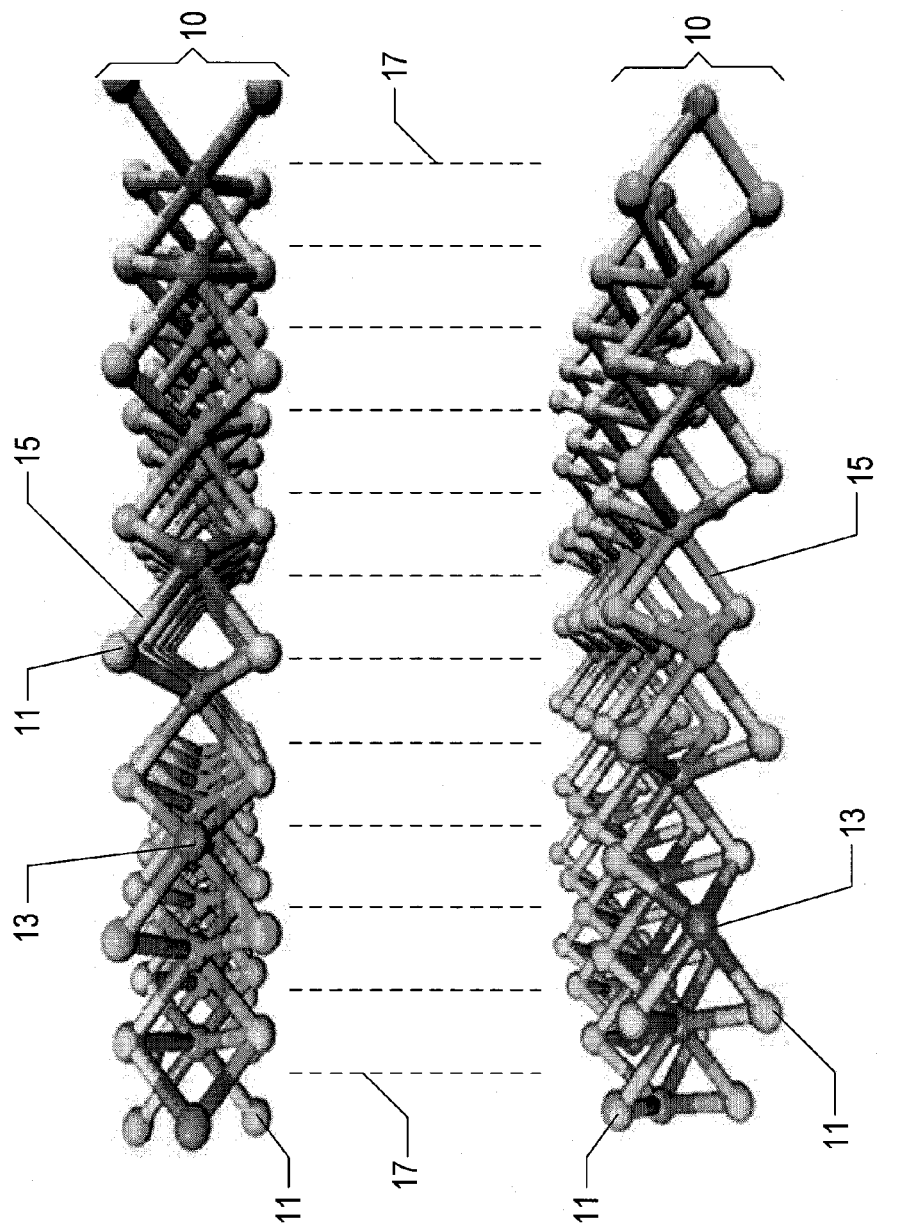
FIGS. 10(A) and 10(B) show schematic diagrams of the crystal structure of molybdenum disulfide.
Figure 10B:
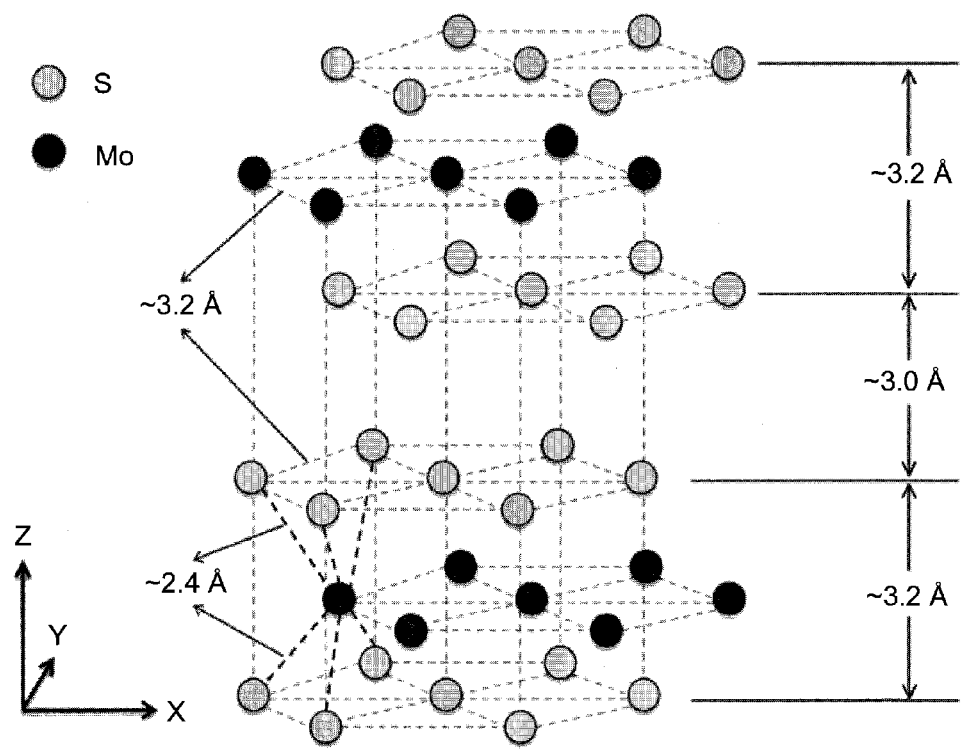

Referring to FIG. 10(A), two intra-molecular covalently bonded S—Mo—S molecular layers 10 are shown with inter-molecular van der Waals bonds 17 between the adjacent sulfur atoms 11 of the two stacked S—Mo—S molecular layers 10. Within each S—Mo—S molecular layer 10, the molybdenum atoms 13 and the sulfur atoms 11 form the tri-layer comprising one planar hexagonal layer of molybdenum atoms 13 interspersed between two planar layers of sulfur atoms 11 and forming covalent bonds 15. Referring to FIG. 10(B), the molybdenum disulfide unit cell has a thickness dimension of approximately 3.241 angstroms across the S—Mo—S molecular layer.

Accordingly, a molybdenum disulfide molecular nano-sheet may comprise a molybdenum disulfide crystal having a thickness dimension corresponding to the thickness of the covalently bonded S—Mo—S molecular layer (without adjoining inter-molecular van der Waals bonded layers, i.e., approximately 3.241 angstroms) and, in some embodiments, length and width dimensions of less than or equal to 1000 nanometers.

The crystal structure of tungsten disulfide is analogous to that of molybdenum disulfide and, therefore, a tungsten disulfide molecular nano-sheet may comprise a tungsten disulfide crystal having a thickness dimension corresponding to the thickness of the covalently bonded S—W—S molecular layer (without adjoining inter-molecular van der Waals bonded layers) and, in some embodiments, length and width dimensions of less than or equal to 1000 nanometers.

Figure 11:
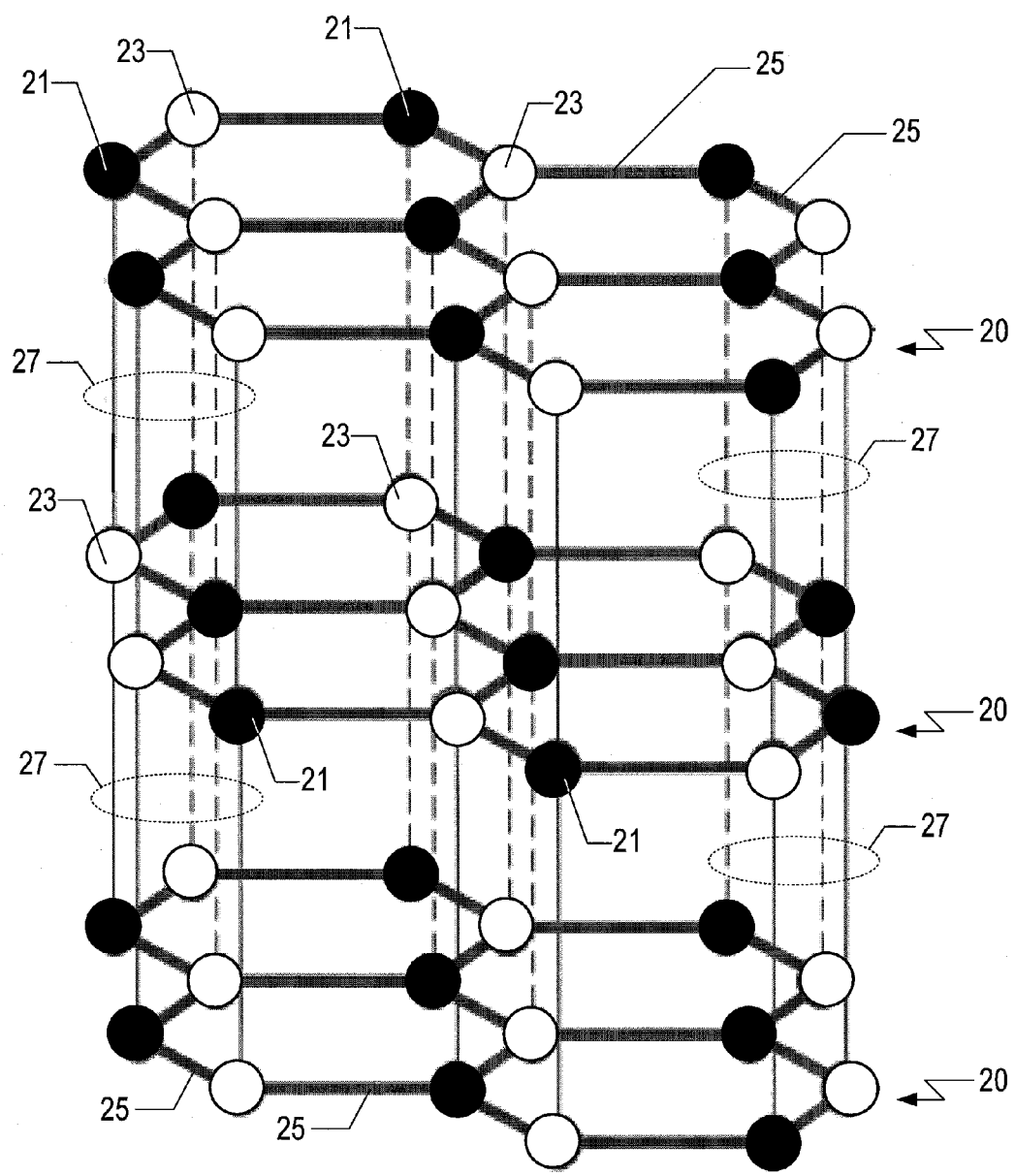
FIG. 11 shows a schematic diagram of the crystal structure of hexagonal boron nitride.

The crystal structure of hexagonal boron nitride is, characterized by hexagonal coordination between three nitrogen atoms and three boron atoms forming adjacent six-sided rings that form intra-molecular covalently-bonded monolayers that are atomically thin (i.e., having a thickness dimension of a single atom). Referring to FIG. 11, three intra-molecular covalently bonded B—N molecular layers 20 are shown with inter-molecular van der Waals bonds 27 between the adjacent B—N molecular layers 20. Within each B—N molecular layer 20, the boron atoms 23 and the nitrogen atoms 21 form the mono-layer comprising the hexagonal atomic orientation within a single plane and forming the covalent bonds 25. Thus, the hexagonal boron nitride crystal structure comprises B—N molecular monolayers, and bulk hexagonal boron nitride comprises relatively weak inter-molecular van der Waals bonds between the adjacent B—N molecular mono-layers. Therefore, a hexagonal boron nitride molecular nano-sheet may comprise a hexagonal boron nitride crystal having a single atomic thickness dimension and, in some embodiments, length and width dimensions of less than or equal to 1000 nanometers.

The crystal structure of graphite (carbon) is analogous to that of hexagonal boron nitride and, therefore, a graphite molecular nano-sheet may comprise a graphene crystal having a single atomic thickness dimension and, in some embodiments, length and width dimensions of less than or equal to 1000 nanometers.

In various embodiments, nano-sheets may comprise a material such as, for example, molybdenum disulfide, tungsten disulfide, niobium diselenide, hexagonal boron nitride, graphite/graphene, metals such as copper or silver, inorganic compounds such as calcium carbonate, polymers such as PTFE, or dithiophosphate compounds. In some embodiments, the nano-sheets may comprise molecular nano-sheets comprising a material such as, for example, molybdenum disulfide, tungsten disulfide, niobium diselenide, hexagonal boron nitride, or graphene. Thus, the compositions described in this specification may comprise molybdenum disulfide nano-sheets, tungsten disulfide nano-sheets, niobium diselenide nano-sheets, hexagonal boron nitride nano-sheets, graphite nano-sheets, graphene molecular nano-sheets, metal (e.g., copper) nano-sheets, inorganic compound (e.g., calcium carbonate) nano-sheets, polymer (e.g., PTFE) nano-sheets, nano-sheets comprising dithiophosphate compounds, or combinations of any thereof.

It is important to recognize that layered materials such as, for example, molybdenum disulfide, tungsten disulfide, niobium diselenide, hexagonal boron nitride, and graphite, may form nano-sheets (e.g., planar-shaped particles having a thickness dimension of less than 500 nanometers and an aspect ratio of at least 2) or molecular nano-sheets (e.g., crystalline molecular structures comprising a thickness dimension corresponding to approximately one unit cell dimension). In this regard, molecular nano-sheets are a sub-genus of nano-sheets.

In various embodiments, the nano-sheets may be functionalized. The nano-sheets may be functionalized with organic molecules or functional groups, inorganic molecules or functional groups, or both organic and inorganic molecules or functional groups, forming functionalized nano-sheets. The nano-sheets may be functionalized with catalysts, antioxidants, anti-corrosion agents, biocidal agents, or combinations of any thereof. Examples of antioxidants, anticorrosion agents, and biocidal agents include, but are not limited to, antioxidants selected from the group consisting of hindered phenols, alkylated phenols, alkyl amines, aryl amines, 2,6-di-tert-butyl-4-methylphenol, 4,4'-di-tert-octyl-diphenylamine, tert-butyl hydroquinone, tris(2,4-di-tert-butylphenyl)phosphate, phosphites, thioesters, or combinations of any thereof; anticorrosion agents selected from the group consisting of alkaline earth metal bisalkylphenolsulphonates, dithiophosphates, alkenylsuccinic acid halfamides, or combinations thereof; and biocidal agents material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, or combinations of any thereof.

In various embodiments, the nano-sheets may be functionalized with a dispersant agent. Suitable dispersant agents may comprise at least one material selected from the group consisting of amide compounds, borate compounds, and boride compounds. For example, a dispersant agent may comprise at least one of succinimide and disodium octaborate tetrahydrate.

In various embodiments, the nano-sheets may be coated and/or encapsulated with an organic medium. For instance, an organic medium may be chemically or physically adsorbed onto nano-sheets or otherwise chemically or physically bonded to nano-sheets. As described above, nanoparticles may be encapsulated and/or intercalated with an organic medium. As used herein, the term "organic medium" refers to hydrophobic/oleophilic substances and carbon-based compounds. For example, the organic medium may comprise at least one material selected from the group consisting of oil media, grease media, alcohol media, composite oils, mineral oils, synthetic oils, canola oil, vegetable oil, soybean oil, corn oil, rapeseed oil, ethyl and methyl esters of rapeseed oil, monoglycerides, distilled monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, lecithins, amide compounds, boron-containing compounds, dithiophosphate compounds, and combinations of any thereof. Examples of suitable dithiophosphate compounds that may comprise an organic medium include, but are not limited to, zinc dialkyl dithiophosphate (ZDDP) and molybdenum dithiophosphate (MoDTP), which may be used alone or in combination with any other organic medium such as an oil medium. In various embodiments, the organic medium may comprise an oil medium such as, for example, a composite oil, a mineral oil, a synthetic oil, canola oil, a vegetable oil, soybean oil, corn oil, a hydrocarbon oil, a mineral oil, or combinations of any thereof.

In addition to the nanoparticles and/or nano-sheets, the compositions described in this specification may also comprise a secondary or tertiary particulate material such as, for example, polytetrafluoroethylene; soft metals such as gold, platinum, silver, lead, nickel, copper; cerium fluoride; zinc oxide; silver sulfate; cadmium iodide; lead iodide; barium fluoride; tin sulfide; zinc phosphate; zinc sulfide; mica; boron nitrate; borax; fluorinated carbon; zinc phosphide; boron; or combinations of any thereof. The secondary or tertiary particulate material may comprise nanoparticles. The secondary or tertiary nanoparticles may have an average primary particle size of less than or equal to 1000 nanometers, and in some embodiments, less than or equal to 500 nanometers, less than or equal to 400 nanometers, less than or equal to 300 nanometers, less than or equal to 200 nanometers, less than or equal to 100 nanometers, less than or equal to 75 nanometers, less than or equal to 50 nanometers, or less than or equal to 25 nanometers.

In various embodiments, the compositions described in this specification may also comprise a base lubricant material, which may be different than the organic medium described above. The nanoparticles and/or nano-sheets may be dispersed in the base lubricant material. The base lubricant material may comprise a material such as, for example, an oil, a grease, a polymer, a plastic, a gel, a wax, a silicone, a hydrocarbon oil, a vegetable oil, corn oil, peanut oil, canola oil, soybean oil, a mineral oil, a paraffin oil, a synthetic oil, a petroleum gel, a petroleum grease, a hydrocarbon gel, a hydrocarbon grease, a lithium based grease, a fluoroether based grease, ethylenebistearamide, or combinations of any thereof. In various embodiments, the base lubricant material may comprise at least one material selected from the group consisting of an oil, a grease, a plastic, a gel, a wax, a silicone, and combinations of any thereof. In various embodiments, the base lubricant material may comprise an oil or a grease. In various embodiments, the base lubricant material may comprise at least one material selected from the group consisting of a mineral oil, a paraffin oil, a synthetic oil, a petroleum grease, a hydrocarbon grease, a lithium based grease, or combinations of any thereof.

In various embodiments, the compositions described in this specification may also comprise an emulsifier. The emulsifier may comprise at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, or combinations of any thereof. In various embodiments, the emulsifier may comprise a compound containing phosphorous. In various embodiments, the emulsifier may comprise a phospholipid. In various embodiments, the emulsifier may comprise a lecithin.

In various embodiments, the compositions described in this specification may also comprise one or more of an antioxidant, an anticorrosion agent, or a biocidal that is not bonded to or adsorbed to the surfaces of nano-sheets. For example, the compositions may comprise at least one antioxidant material selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, or combinations of any thereof. The compositions may comprise at least one anticorrosion agent selected from the group consisting of alkaline earth metal bisalkylphenolsulphonates, dithiophosphates, alkenylsuccinic acid half-amides, or combinations thereof. The compositions may comprise at least one biocidal material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, or combinations of any thereof.

The compositions described in this specification may be used to formulate a lubricant. For example, compositions comprising nanoparticles and/or nano-sheets may be used as performance-enhancing additives to off-the-shelf liquid based lubricants. Additionally, lubricant compositions may comprise nanoparticles and/or nano-sheets dispersed in a lubricant base material as described above, wherein a separate organic medium is intercalated in the nanoparticles, encapsulates the nanoparticles, and/or encapsulates the nano-sheets. Lubricant compositions comprising nanoparticles and/or nano-sheets, with or without an intercalating and/or encapsulating organic medium, in accordance with the embodiments described in this specification, will provide a synergistically enhanced combination of lubrication in mechanical systems.

The compositions described in this specification may be used to formulate a coating or solid film on a substrate or surface. For example, compositions comprising nanoparticles and/or nano-sheets, with or without an intercalating and/or encapsulating organic medium, may be physically rubbed onto substrates and surfaces to form burnished films and coatings. Compositions comprising nanoparticles and/or nano-sheets, with or without an intercalating and/or encapsulating organic medium, may also be deposited as solid films and coatings using pneumatic methods analogous to sandblasting. Compositions comprising nanoparticles and/or nano-sheets, with or without an intercalating and/or encapsulating organic medium, may also be added to thermoplastic or thermosetting resinous binders to make film-forming coating compositions (e.g., binders based on epoxy, urethane, urea, acrylic, phenolic, amide-imide, polyimide, azole, and like chemical systems).

In various embodiments, compositions comprising nanoparticles and/or nano-sheets, with or without an intercalating and/or encapsulating organic medium, may be used in a method to lubricate a surface and/or deliver active materials and agents to the surface, including catalysts, anti-corrosion agents, antioxidants, biocidal agents, and other functional groups and molecules. The method may comprise applying the compositions described in this specification to the surface or otherwise contacting the surface with the compositions. The surface and the applied/contacting composition are subjected to a frictional force, pressure, or other mechanical stress, which causes constituent layers of the nanoparticles to delaminate and form a plurality of nano-sheets. In this manner, for example, nano-sheets may be formed in situ on a surface as the force/pressure exfoliates the constituent molecular layers of nanoparticles having an open architecture. In various embodiments, the compositions may comprise an organic medium and the organic medium coats or encapsulates the nano-sheets formed in situ. The coated or encapsulated nano-sheets formed in situ may deposit on the surface in a tribo-film.

The compositions described in this specification may be made from solid lubricant starting or feed materials. Examples of solid lubricants may include, but are not limited to, layered materials such as, for example, hexagonal boron nitride and chalcogenides, like molybdenum disulfide, tungsten disulfide, niobium diselenide, or a combination thereof. Other suitable layered materials include graphite. Other solid lubricant starting or feed materials that may be used alone or in combination with the layered materials include, but are not limited to polytetrafluoroethylene, soft metals (such as, for example, silver, lead, nickel, copper), cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, or a combination thereof. Fluorinated carbons may be, without limitation, carbon-based materials such as graphite which has been fluorinated to improve its aesthetic characteristics. Such materials may include, for example, a material such as $CF_x$ wherein x ranges from about 0.05 to about 1.2. Such a material is produced, for example, by Allied Chemical under the trade name Accufluor.

The methods of making the nanoparticles encapsulated and/or intercalated with the organic medium, and the nano-sheets, may include, for example, the milling of a solid lubricant feed material. In various embodiments, the solid lubricant feed material may be capable of being milled to particles comprising an average primary particle size of about 1000 nanometers or less (submicron size), for example, from about 500 nanometers to about 10 nanometers. The particles may have an average primary particle size of less than or equal to about 500 nanometers, less than or equal to about 100 nanometers, less than or equal to about 75 nanometers, and less than or equal to about 50 nanometers. Alternatively, the milling may result in milled lubricant particles comprising a mixture, the mixture comprising particles having an average primary particle size of less than or equal to about 500 nanometers, plus larger particles. Additionally, the milling may result in milled nano-sheets in combination with nanoparticles.

The milling may include, among other techniques, ball milling and chemo-mechanical milling. Examples of ball milling may include dry ball milling, wet ball milling, and combinations thereof. Ball milling may refer to an impaction process that may include two interacting objects where one object may be a ball, a rod, 4 pointed pins (jack shape), or other shapes. Chemo-mechanical milling may refer to an impaction process that may form an integrated complex between the organic medium and the nanoparticles, and between the organic medium and the nano-sheets. As a result of chemo-mechanical milling, the organic medium may coat, encapsulate, and/or intercalate the nanoparticles, and coat and/or encapsulate the nano-sheets. In various embodiments, chemo-mechanical milling may be performed using a ball milling technique.

In various embodiments, the solid lubricant feed material may be dry milled and then wet milled. An emulsifier may be mixed with a lubricant base material and added to the wet milled particles. Dry milling may refer to particles that have been milled in the presence of a vacuum, a gas, or a combination thereof. Wet milling may refer to particles that have been milled in the presence of a liquid.

As described above, the lubricant nanoparticle composition may further comprise an organic medium. Examples of organic media include, but are not limited to, oil media, grease media, alcohol media, or combinations thereof. Specific examples of organic media include, but are not limited to, composite oil, canola oil, vegetable oils, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, n-hexadecane, hydrocarbon oils, phospholipids, or a combination thereof. Many of these organic media may be environmentally acceptable.

The compositions described in this specification may contain emulsifiers, surfactants, or dispersants. Examples of emulsifiers may include, but are not limited to, emulsifiers having a hydrophilic-lipophilic balance (HLB) from about 2 to about 7; a HLB from about 3 to about 5; or a HLB of about 4. Examples of emulsifiers may include, but are not limited to, lecithins, soy lecithins, phospholipid lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, or a combination thereof.

Examples of surfactants that may be included in the compositions described in this specification include, but are not limited to, 2-alkyl-succinic acid 1-propyl ester, canola oil, dialkyl hydrogen phosphite, glycerol mono oleate, lecithin, octadecylamine, oleic acid, oleylamide, oleylamine, poly(methyl methacrylate), sodium stearate, Span 80, stearic acid, thiocarbamates (molybdenum dithiocarbamate or MoDTC), thiophosphates (molybdenum dithiophosphate or MoDTP, zinc dialkyl dithiophosphate or ZDDP), trioctylphosphine oxide, Tween 20, or combinations of any thereof.

Examples of dispersants that may be included in the compositions described in this specification include, but are not limited to, polyisobutylene succinimides (PIBS), succinic anhydrides, PIBS anhydrides, succiniate esters, metal sulfonates, polymeric detergents, polymeric dispersants, polyoxyethylene alkyl ethers, polyoxyethylene dialkylphenol ethers, polyalphaolefins (PAO), alkylglycoside, polyoxyethylene fatty acid esters, sucrose fatty acid esters, sorbitan fatty acid esters, polyoxyethylene sorbitan fatty acid esters, borate esters, phosphate esters, phosphate amines, fatty acid alkanolamide, and combinations thereof. In various embodiments, amine-containing dispersants, such as, for example, phosphate amines, may comprise reaction products of amines including, but not limited to, ethylenediamine, diethylenetriamine, pentaethylenehexamine, polyethyleneamine, tetraethylenepentamine, triethylenetetramine, or combinations of any thereof.

A method of making a composition, such as, for example, a lubricant additive or a primary lubricant formulation, is described. The composition may be used as an additive dispersed in a lubricant base material or as a component of a primary lubricant formulation. Examples of lubricant base materials may include, but are not limited to, oils, greases, plastics, gels, sprays, or a combination thereof. Specific examples of bases may include, but are not limited to, hydrocarbon oils, vegetable oils, corn oil, peanut oil, canola oil, soybean oil, mineral oil, paraffin oils, synthetic oils, petroleum gels, petroleum greases, hydrocarbon gels, hydrocarbon greases, lithium based greases, fluoroether based greases, ethylenebistearamide, waxes, silicones, or a combination thereof.

Described in this specification is a method of lubricating or coating an object that is part of an end application with a composition comprising nanoparticles and/or nano-sheets, with or without an intercalating and/or encapsulating organic medium. Further described is a method of lubricating an object by employing nanoparticles and/or nano-sheets, with or without an intercalating and/or encapsulating organic medium, as a delivery mechanism.

The compositions and methods described in this specification exhibit, among various advantages, enhanced dispersion stability, resistance to agglomeration, and corrosion resistance. FIG. 1 illustrates a method of preparing nanoparticle based lubricants or compositions. A solid lubricant feed is introduced via line 210 to a ball milling processor 215. Ball milling is carried out in the processor 215 and the solid lubricant feed is milled to comprise particles having an average primary particle size of less than or equal to about 1000 nanometers, less than or equal to about 500 nanometers, less than or equal to about 100 nanometers, less than or equal to about 80 nanometers, or less than or equal to about 50 nanometers. Alternatively, the ball milling may result in milled lubricant particles comprising a mixture, the mixture comprising particles having an average particle dimension of less than or equal to about 1000 nanometers or less than or equal to about 500 nanometers, plus larger particles. The ball milling may be high energy ball milling, medium energy ball milling, or combinations thereof. Additionally, in various embodiments the ball milling may be carried out in a vacuum, in the presence of a gas, in the presence of a liquid, in the presence of a second solid, or combinations thereof. The nanoparticle composition may be removed from the processor via line 220. The nanoparticle composition may be a nanoparticle based lubricant.

Figure 2:
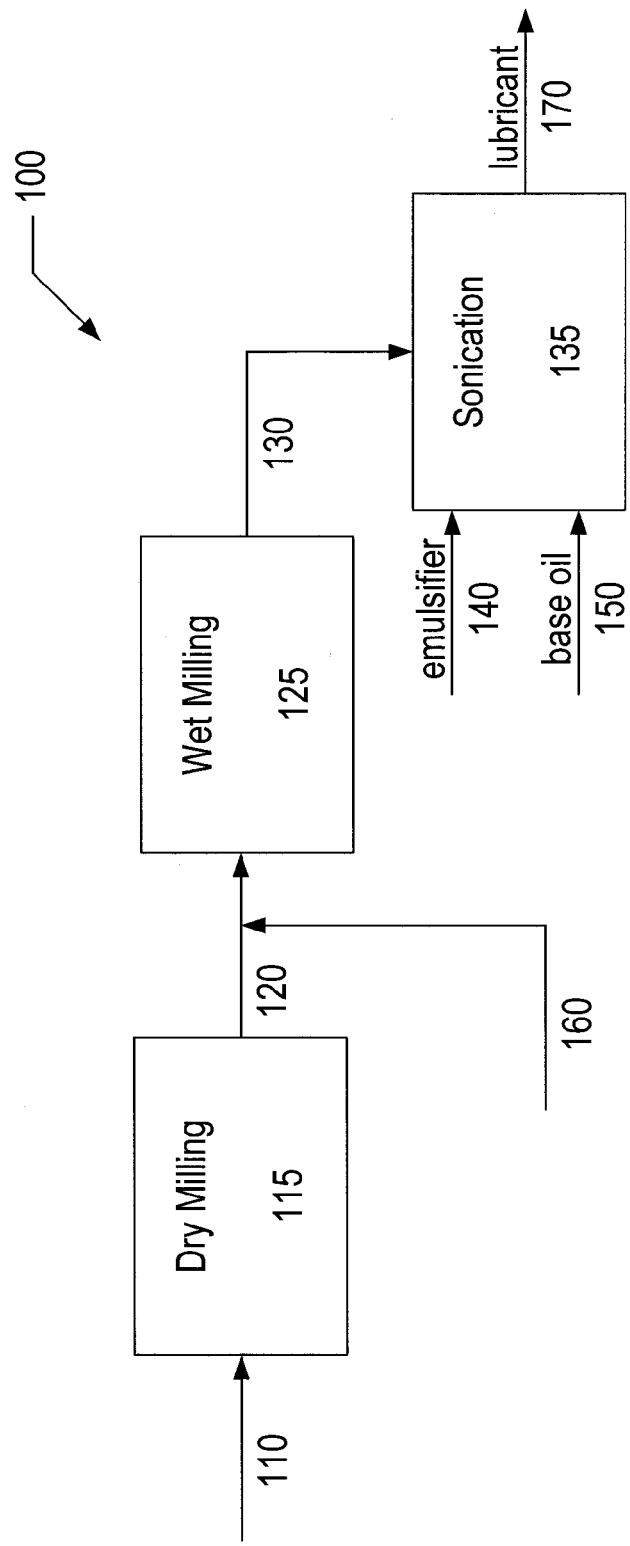
FIG. 2 is a diagram illustrating one method of preparing nanoparticle based lubricants.

In various embodiments, the ball milling may comprise a first ball milling and at least one more subsequent ball millings, or ball milling and/or other processing as appropriate. The ball milling may comprise dry milling followed by wet milling. FIG. 2 illustrates a further method 100 of preparing nanoparticle based lubricants and other compositions where dry milling is followed by wet milling. Feed 110 introduces a solid lubricant feed into a ball milling processor 115 where dry ball milling, such as in a vacuum or in air, reduces the solid lubricant feed to particles having an average dimension of the size described above. Line 120 carries the dry milled particles to a wet milling processor 125. Via line 160 the dry milled particles are combined with a composite oil or an organic medium prior to entering the wet milling processor 125. Alternatively, the organic medium and dry milled particles may be combined in the wet milling processor 125. In further alternative embodiments (not shown), the dry milling and wet milling may be carried out in a single processor where the organic medium is supplied to the single processor for wet milling after initially carrying out dry milling. In other alternative embodiments, the balls in the ball milling apparatus may be coated with the organic medium to incorporate the organic medium in the nanoparticles and/or onto the nano-sheets.

After wet milling, line 130 carries the wet milled particles to a container 135, which may be a sonication device. Alternatively, line 130 may carry a mixture comprising nanoparticles and/or nano-sheets, organic medium, and a complex comprising nanoparticles combined with an organic medium and/or nano-sheets combined with an organic medium.

In another embodiment, prior to introduction of the wet milled particles into the container 135, a lubricant base material may be fed to the container 135 via line 150. Alternatively, the base may be supplied to the wet milling processor 125 and the mixing, which may include sonicating, may be carried out in the wet milling processor 125. In such embodiments the lubricant nanoparticle and/or nano-sheet composition may be employed as an additive and dispersed in the lubricant base material. A lubricant base material may be paired with a lubricant nanoparticle and/or nano-sheet composition according to the ability of the base material and the lubricant nanoparticle and/or nano-sheet composition to blend appropriately. In such cases the lubricant nanoparticle and/or nano-sheet composition may enhance the performance characteristics of the base.

In various embodiments, an emulsifier may be mixed with the lubricant base material. Emulsifiers may further enhance dispersion of the lubricant nanoparticle and/or nano-sheet composition in the lubricant base material. The emulsifier may be selected to enhance the dispersion stability of a nanoparticle or nano-sheet composition in a base. An emulsifier may also be supplied to the container 135 via line 140. In some embodiments, the emulsifier and base are combined in the container 135 prior to introduction of the wet milled particles. Prior mixing of the emulsifier with the base material may enhance dispersion upon addition of nanoparticles, nano-sheets, and/or complexes thereof with an organic medium, by homogeneously dispersing the nanoparticles/nano-sheets/complexes. In some embodiments, the mixing of the emulsifier and base may comprise sonicating. The emulsifier may be supplied to the wet milling processor 125 and the mixing, which may include sonicating, may be carried out in the wet milling processor 125. The lubricant removed from the container 135 via line 120 may be a blend comprising the wet milled particles, organic medium, and base. The blend may further comprise an emulsifier.

In various embodiments, antioxidants or anticorrosion agents may be milled with the nanoparticles and/or nano-sheets or added to prior-milled nanoparticles and/or nano-sheets. Examples of antioxidants include, but are not limited to, hindered phenols, alkylated phenols, alkyl amines, aryl amines, 2,6-di-tert-butyl-4-methylphenol, 4,4'-di-tert-octyl-diphenylamine, tert-Butyl hydroquinone, tris(2,4-di-tert-butylphenyl)phosphate, phosphites, thioesters, or combinations of any thereof. Examples of anticorrosion agents include, but are not limited to, alkaline-earth metal bisalkylphenolsulphonates, dithiophosphates, alkenylsuccinic acid half-amides, or combinations of any thereof. In various embodiments, biocidals may be milled with the nanoparticles and/or nano-sheets or added to prior-milled nanoparticles and/or nano-sheets. Examples of biocidals may include, but are not limited to, alkyl or hydroxylamine benzotriazole, an amine salt of a partial alkyl ester of an alkyl, alkenyl succinic acid, or a combination thereof.

In various embodiments, further processing of wet milled nanoparticles and/or nano-sheets may comprise removal of oils that are not a part of a complex with the lubricant particles or nano-sheets. Such methods may be suitable for applications that benefit from use of dry particles and sheets of lubricant, such as coating applications. Oil and/or other liquids can be removed from wet milled nanoparticles and/or nano-sheets to produce substantially dry lubricant particles, sheets, and complexes having intercalated and/or encapsulated organic media. Such wet milling followed by drying may produce a lubricant with reduced tendency to agglomerate. In specific embodiments, an agent, such as acetone or other suitable solvent, may be added that dissolves oils that are not a part of a complex with the nanoparticles or nano-sheets, followed by a drying process such as supercritical drying, to produce a substantially dry lubricant comprising particles or sheets treated by milling in an organic medium.

Ball milling conditions may vary and, in particular, conditions such as temperature, milling time, and size and materials of the balls and vials may be manipulated. In various embodiments, ball milling may be carried out from about 12 hours to about 50 hours, from about 36 hours to about 50 hours, from about 40 hours to about 50 hours, or for about 48 hours (±1 hour, ±2 hours, or ±3 hours). Ball milling may be conducted at room temperature or elevated temperatures. The benefits of increasing milling time may comprise at least one of increasing the time for the organic medium and nanoparticles to interact, integrate, and complex; and producing finer sizes, better yield of nanoparticles, more uniform shapes, and more passive surfaces. An example of ball milling equipment suitable for carrying out the described milling includes the SPEX CertiPrep model 8000D, along with hardened stainless steel vials and hardened stainless steel grinding balls, but any type of ball milling apparatus may be used. In some embodiments, a stress of 600-650 MPa, a load of 14.9 N, and a strain of $10^{-3}$-$10^{-4}$ per second may be used.

In various embodiments, a hybrid milling process may produce a mixture of both nanoparticles encapsulated and/or intercalated with an organic medium and nano-sheets coated and/or encapsulated with an organic medium. The hybrid milling process may produce combinations of nanoparticles and nano-sheets that are functionalized, for example, with catalysts, antioxidants, anti-corrosion agents, biocidals, or combinations of any thereof.

The proportions of the components in a nanoparticle and/or nano-sheet based lubricant or other composition may contribute to performance of the composition, such as the composition's dispersion stability and ability to resist agglomeration. In wet milling, suitable starting ratios of solid lubricant feed particles to organic medium may be about 1 part particles to about 4 parts organic medium by weight, about 1 part particles to about 3 parts organic medium by weight, about 3 parts particles to about 8 parts organic medium by weight, about 2 parts particles to about 4 parts organic medium by weight, about 1 part particles to about 2 parts organic medium by weight, or about 1 part particles to about 1.5 parts organic medium by weight.

Suitable ratios of organic medium to emulsifier in a composition including nanoparticles and/or nano-sheets may be about 1 part organic medium to less than or equal to about 1 part emulsifier, about 1 part organic medium to about 0.5 parts emulsifier by weight, or from about 0.4 to about 1 part emulsifier for about 1 part organic medium by weight.

The amount of lubricant nanoparticle and/or nano-sheet composition (by weight) sonicated or dispersed in a lubricant base material may comprise from about 0.25% to about 5%, about 0.5% to about 3%, about 0.5% to about 2%, or about 0.75% to about 2%, based on total weight of the composition.

The amount of emulsifier (by weight) sonicated or dissolved in a lubricant base material, depending on the end application, shelf-life, and the like, may comprise from about 0.5% to about 10%, from about 4% to about 8%, from about 5% to about 6%, or from about 0.75% to about 2.25%, based on total weight of the composition.

The compositions described in this specification may be used, without limitation, as lubricants, coatings, delivery mechanisms, or combinations of any thereof. The compositions may be used, without limitation, as an additive dispersed in a base oil or other lubricant composition. The compositions may also be used, without limitation, to lubricate a boundary lubrication regime. A boundary lubrication regime may be a lubrication regime where the average lubricant film thickness may be less than the composite surface roughness and the surface asperities may come into contact with each other under relative motion. During the relative motion of two surfaces with lubricants in various applications, three different lubrication stages may occur, and the boundary lubrication regime may be the most severe condition in terms of temperature, pressure and speed. Mating parts may be exposed to severe contact conditions of high load, low velocity, extreme pressure (for example, 1-2 GPa), and high local temperature (for example, 150-300 degrees C.). The boundary lubrication regime may also exist under lower pressures and low sliding velocities or high temperatures. In the boundary lubrication regime, the mating surfaces may be in direct physical contact.

The compositions may further be used, without limitation, as a lubricant or coating in machinery applications, manufacturing applications, mining applications, aerospace applications, automotive applications, pharmaceutical applications, medical applications, dental applications, cosmetic applications, food product applications, nutritional applications, health related applications, bio-fuel applications or a combination thereof. Specific examples of uses in end applications include, without limitation, machine tools, bearings, gears, camshafts, pumps, transmissions, piston rings, engines, power generators, pin-joints, aerospace systems, mining equipment, manufacturing equipment, or a combination thereof. Further specific examples of uses may be, without limitation, as an additive in lubricants, greases, gels, compounded plastic parts, pastes, powders, emulsions, dispersions, or combinations thereof. The compositions may also be used as a lubricant that employs the lubricant nanoparticle and/or nano-sheet composition as a delivery mechanism in pharmaceutical applications, medical applications, dental applications, cosmetic applications, food product applications, nutritional applications, health related applications, bio-fuel applications, or a combination thereof. The various compositions and methods may also be used, without limitation, in hybrid inorganic-organic materials. Examples of applications using inorganic-organic materials, include, but are not limited to, optics, electronics, ionics, mechanics, energy, environment, biology, medicine, smart membranes, separation devices, functional smart coatings, photovoltaic and fuel cells, photocatalysts, new catalysts, sensors, smart microelectronics, micro-optical and photonic components and systems for nanophotonics, innovative cosmetics, intelligent therapeutic vectors that combined targeting, imaging, therapy, and controlled release of active molecules, and nanoceramic-polymer composites.

Figure 7:
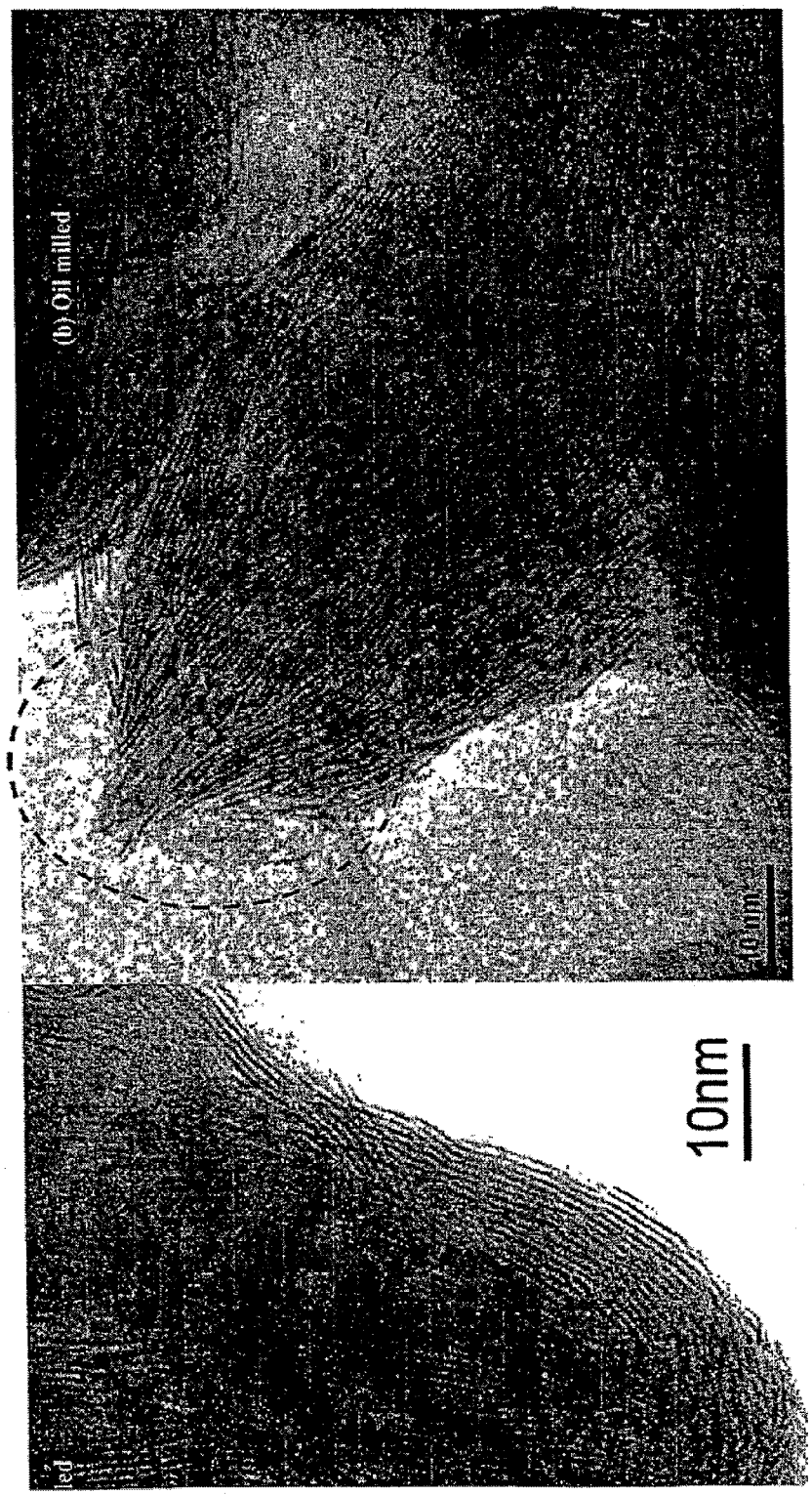
FIG. 7 is a TEM image showing the architecture of molybdenum disulfide nanoparticles (15-70 nm average size)
Figure 8:
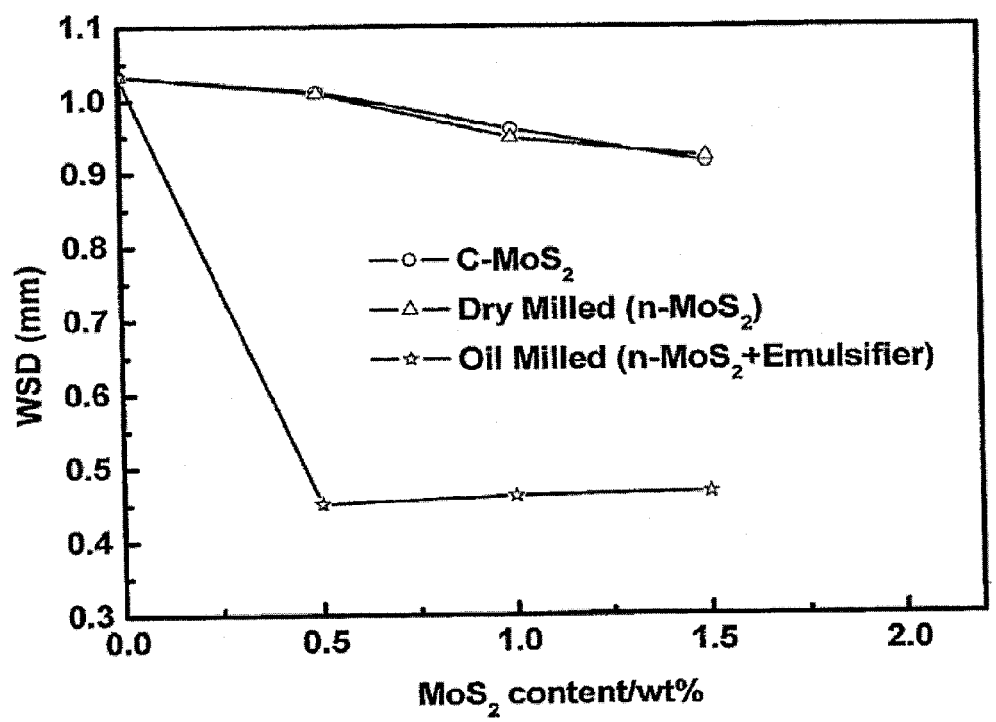
FIG. 8 is a graph depicting a comparison of wear scar diameters for different additives in paraffin oil; one additive is crystalline molybdenum disulfide (c-$MoS_2$); another is molybdenum disulfide nanoparticles that were ball milled in air (n-$MoS_2$); another additive is molybdenum disulfide nanoparticles that were ball milled in air followed by ball milling in canola oil and to which a phospholipid emulsifier was added (n-$MoS_2$+Emulsifier)

In some embodiments, the dry ball milling operations may create a close caged dense oval shaped architecture (similar to a football shape or fullerene type architecture). This may occur when solid lubricant feed materials are milled in a gas or vacuum. FIG. 7(A) shows the close caged dense oval shaped architecture of molybdenum disulfide nanoparticles that have been ball milled in air for 48 hours.

In some embodiments, the wet ball milling operation may create an open architecture (as described above), which may be encapsulated and/or intercalated with an organic medium. This may occur when solid lubricant feed materials are milled in a gas or vacuum followed by milling in an organic medium. FIG. 7(B) shows the open architecture of molybdenum disulfide nanoparticles that have been ball milled in air for 48 hours followed by ball milling in canola oil for 48 hours. In other embodiments, the ball milling operations may create nano-sheets, which may be coated and/or encapsulated with an organic medium, or functionalized with catalysts, antioxidants, anti-corrosion agents, biocidals, or combinations of any thereof.

As shown in the examples, the tribological performance of a nanoparticle based lubricant may be improved. The tribological performance may be measured by evaluating different properties. An anti-wear property may be a lubricating fluid property that has been measured using the industry standard Four-Ball Wear (ASTM D4172) Test. The Four-Ball Wear Test may evaluate the protection provided by a lubricant under conditions of pressure and sliding motion. Placed in a bath of the test lubricant, three fixed steel balls may be put into contact with a fourth ball of the same grade in rotating contact at preset test conditions. Lubricant wear protection properties may be measured by comparing the average wear scars on the three fixed balls. The smaller the average wear scar, the better the protection. Extreme pressure properties may be lubricating fluid properties that have been measured using the industry standard Four-Ball Wear (ASTM D2783) Test. This test method may cover the determination of the load-carrying properties of lubricating fluids. The following two determinations may be made: 1) load-wear index (formerly Mean-Hertz load) and 2) weld load (kg). The load-wear index may be the load-carrying property of a lubricant. It may be an index of the ability of a lubricant to minimize wear at applied loads. The weld load may be the lowest applied load in kilograms at which the rotating ball welds to the three stationary balls, indicating the extreme pressure level that the lubricants can withstand. The higher the weld point scores and load wear index values, the better the anti-wear and extreme pressure properties of a lubricant. The coefficient of friction (COF) may be a lubricating fluid property that has been measured using the industry standard Four-Ball Wear (ASTM D4172) Test. COF may be a dimensionless scalar value which describes the ratio of the force of friction between two bodies and the force pressing them together. The coefficient of friction may depend on the materials used. For example, ice on metal has a low COF, while rubber on pavement has a high COF. A common way to reduce friction may be by using a lubricant which is placed between two surfaces.

The compositions described in this specification may have a wear scar diameter of about 0.4 mm to about 0.5 mm. The composition may have a COF of about 0.06 to about 0.08. The composition may have a weld load of about 150 kg to about 350 kg. The composition may have a load wear index of about 20 to about 40. The values of these tribological properties may change depending on the amount of lubricant nanoparticle and/or nano-sheet composition sonicated or dissolved in the lubricant base material.

The non-limiting and non-exhaustive examples that follow are intended to further describe various non-limiting and non-exhaustive embodiments without restricting the scope of the embodiments described in this specification.

EXAMPLES

Example 1

Ball milling was performed in a SPEX 8000D machine using hardened stainless steel vials and balls. $MoS_2$ (Alfa Aesar, 98% pure, 700 nm average primary particle size) and canola oil (Crisco) were used as the starting materials in a ratio of 1 part $MoS_2$ (10 grams) to 2 parts canola oil (20 grams). The ball to powder weight ratio was 2 to 1. $MoS_2$ was ball milled for 48 hours in air followed by milling in canola oil for 48 hrs at room temperature. The nanoparticles were about 50 nm after ball milling. Table 1 summarizes milling conditions and resultant particle morphologies. It was observed that there was a strong effect of milling media on the shape of the ball milled nanoparticles. Dry milling showed buckling and folding of the planes when the particle size was reduced from micron size to nanometer size. However, the dry milling condition used here produced micro clusters embedding several nanoparticles. On the other hand, wet milling showed no buckling but saw de-agglomeration.

TABLE 1

Milling conditions and parametric effect on particle size and shape

| | Shape of the particles | Shape of the clusters |
|---|---|---|
| Dry Milling | | |
| 12 hours | Plate-like with sharp edges | Sharp and irregular |
| 24 hours | Plate-like with round edges | More or less rounded |
| 48 hours | Spherical | Globular clusters |
| Wet Milling | | |
| 12 hours | Thin plates with sharp edges | Thing plates with sharp edges |
| 24 hours | Thin plates with sharp edges | Thin plates with sharp edges |
| 48 hours | Thin plates with sharp edges | Thin plates with sharp edges |

TABLE 2

Effect of milling media on resultant size (starting size sub-micron), shape, and agglomeration of particles

| Properties | Dry | Alcohol | Oil | Dry milled and oil milled |
|---|---|---|---|---|
| Clusters size (nm) | 100 | 300 | 200 | 100 |
| Particle size (nm) | 30 | 80 | 80 | 30 |
| Agglomeration | High | Very less | Very less | Very less |
| Shape of the particles | Spherical | Platelet | Platelet | Spherical |

Figure 3:
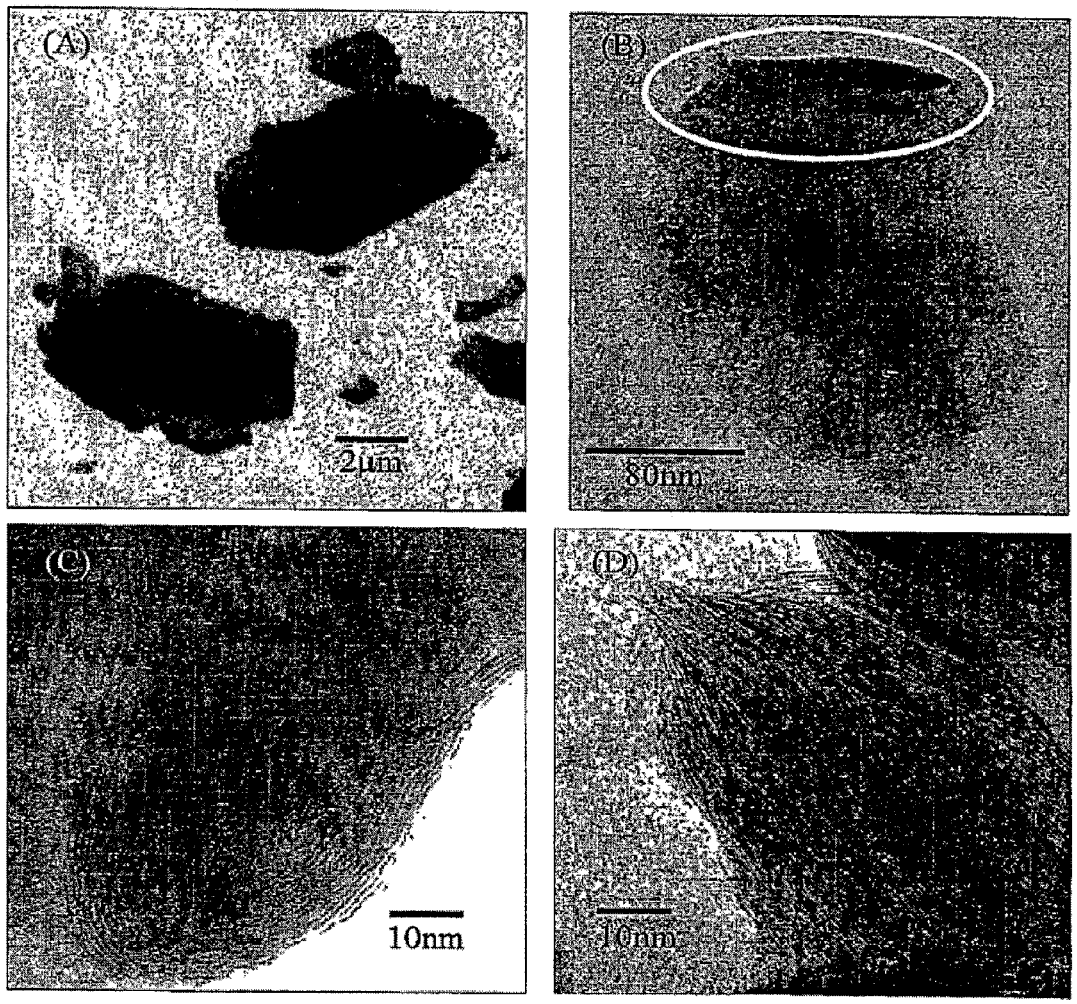
FIG. 3 shows transmission electron microscopy (TEM) micrographs of molybdenum disulfide particles.

FIG. 3 shows TEM micrographs of the as-available (700 nm), air milled, and hybrid milled (48 hrs in air medium followed by 48 hours in oil medium) $MoS_2$ nanoparticles. FIG. 3(A) represents micron-sized particle chunks of the as-available $MoS_2$ sample off the shelf. These micrographs, particularly FIG. 3(B), represent agglomerates of nanoparticles when milled in the air medium. FIG. 3(B) clearly demonstrates size reduction in air milled $MoS_2$. Higher magnification (circular regions) revealed formation of the disc shaped nanoparticles after milling in the air medium. From FIGS. 3(C) and 3(D) it may be concluded that the particle size was reduced to less than 30 nm after milling in air and hybrid conditions. Regardless of the occasionally observed clusters, the average size of the clusters is less than or equal to 200 nm.

Hybrid milled samples were dispersed in paraffin oil (from Walmart) and remained suspended without settling. However, the dispersion was not uniform after a few weeks. To stabilize the dispersion and extend the anti-wear properties, phospholipids were added. Around 2% by weight of soy lecithin phospholipids (from American Lecithin) was added in the base oil.

Figure 4:
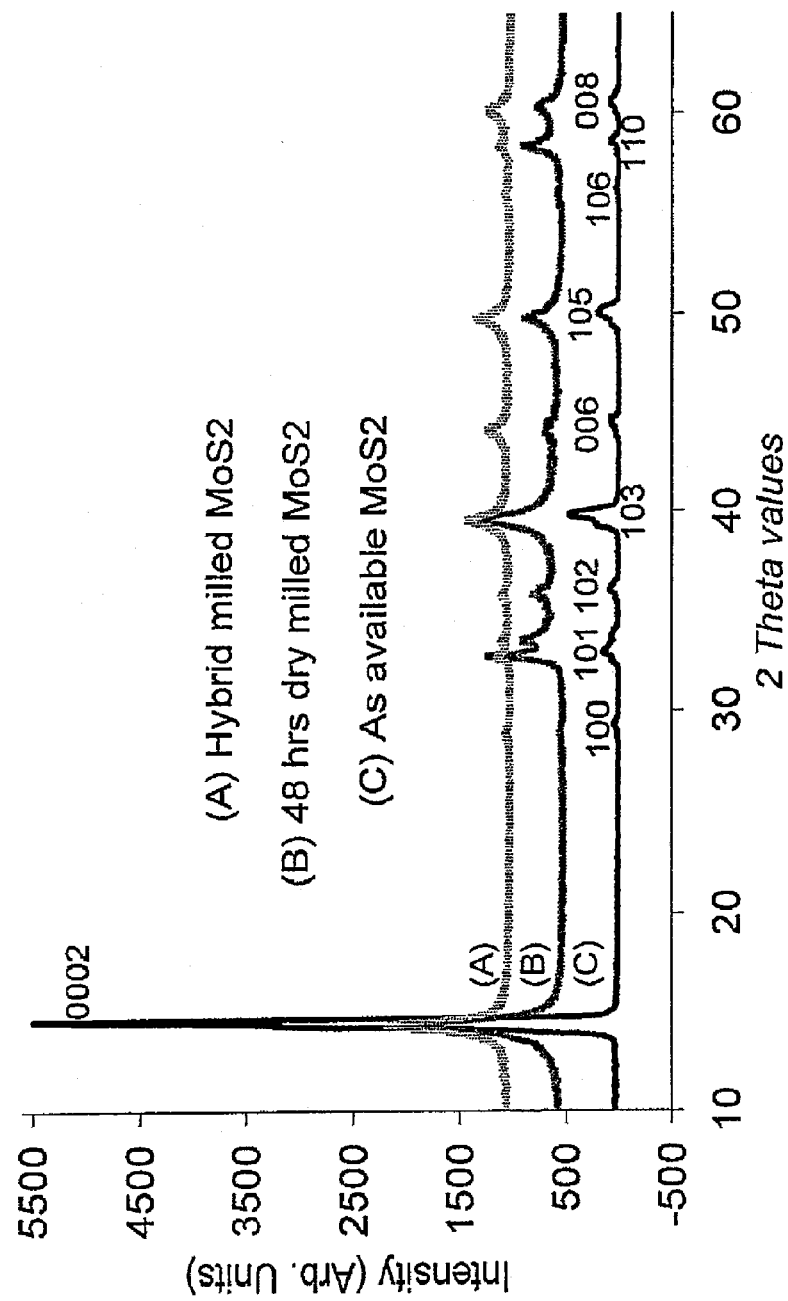
FIG. 4 is a graph showing XRD spectra of molybdenum disulfide particles.
Figure 5:
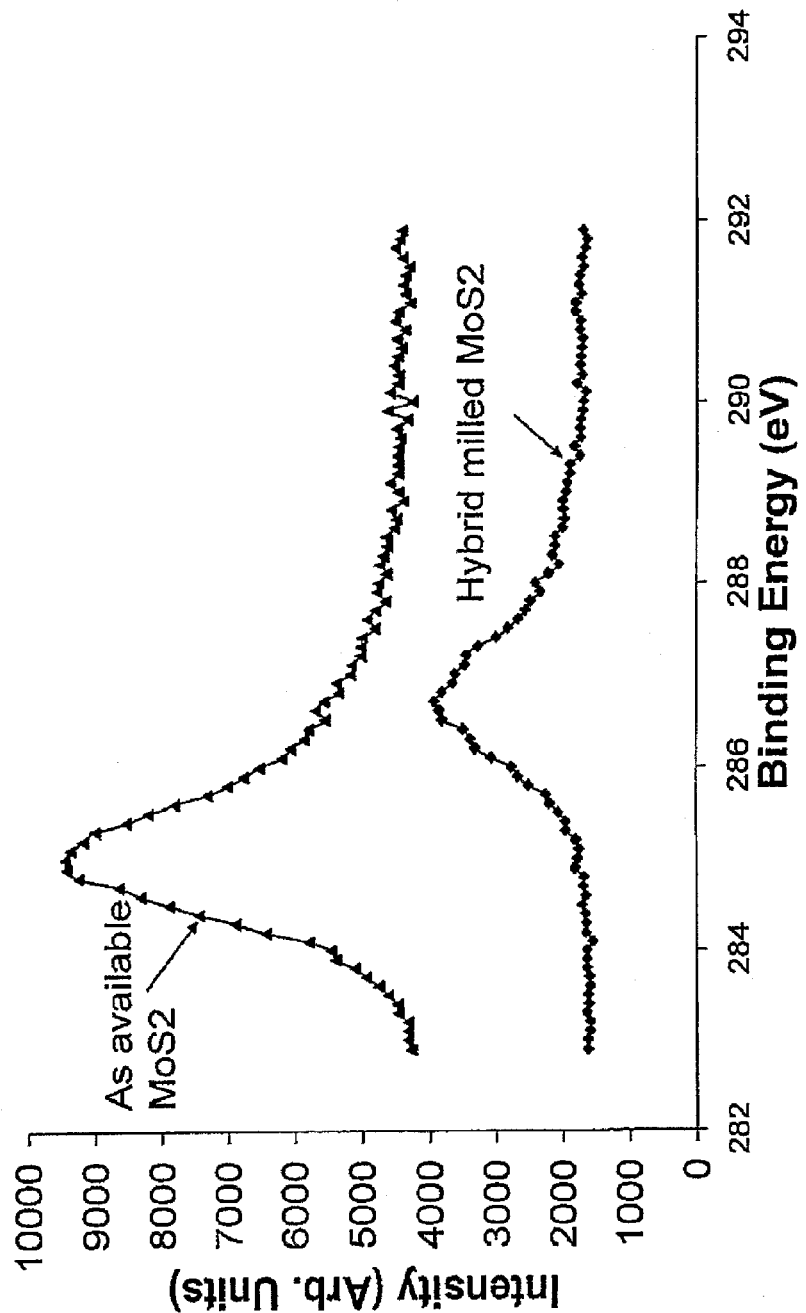
FIG. 5 is a graph showing XPS spectra of molybdenum disulfide particles in which the carbon peak for molybdenum disulfide that has not been ball milled is shown, as well as the carbon peak for molybdenum disulfide that has been ball milled in air for 48 hours, followed by ball milling in oil for 48 hours.

FIGS. 4 and 5 show the XRD and XPS spectra of $MoS_2$ before and after ball milling, respectively. XRD spectra revealed no phase change as well as no observable amorphization in the $MoS_2$ after milling. This observation is consistent with the continuous platelets observed throughout the nanoparticle matrix in TEM analysis for milled material. Broadening of peaks (FWHM) was observed in XRD spectra of $MoS_2$ ball milled in air and hybrid media, respectively. The peak broadening may be attributed to the reduction in particle size. The estimated grain size is 6 nm. This follows the theme of ball milling where clusters consist of grains and sub-grains of the order of 10 nm. XPS analysis was carried out to study the surface chemistry of the as-available and hybrid milled $MoS_2$ nanoparticles. As shown in FIG. 5, a carbon (C) peak observed at 285 eV in the as-available MoS$_2$ sample shifted to 286.7 eV. Bonding energies of 286 eV and 287.8 eV correspond to C—O and C=O bond formation, respectively. The observed binding energy level may demonstrate that a thin layer containing mixed C—O and C=O groups encapsulates the MoS$_2$ particles.

Preliminary tribological tests on the synthesized nanoparticles were performed on a four-ball machine by following ASTM 4172. The balls used were made of AISI 52100 stainless steel and were highly polished. Four Ball Wear Scar measurements using ASTM D4172 were made under the following test conditions:

| | |
|---|---|
| Test Temperature, ° C. | 75 (±1.7) |
| Test Duration, min | 60 (±1) |
| Spindle Speed, rpm | 1,200 (±60) |
| Load, kg | 40 (±0.2) |

Wear scar diameter (WSD, mm) of each stationary ball was quantified in both vertical and horizontal directions. The average value of WSD from 3 independent tests was reported within±0.03 mm accuracy.

Four Ball Extreme Pressure measurements using ASTM D2783 were made under the following test conditions:

| | |
|---|---|
| Test Temperature, ° C. | 23 |
| Test Duration, min | 60 (±1) |
| Spindle Speed, rpm | 1,770 (±60) |
| Load, kg | Varies, 10-sec/stage |
| Ball Material | AISI-E52100 |
| Hardness | 64-66 |
| Grade | 25EP |

Figure 6A:
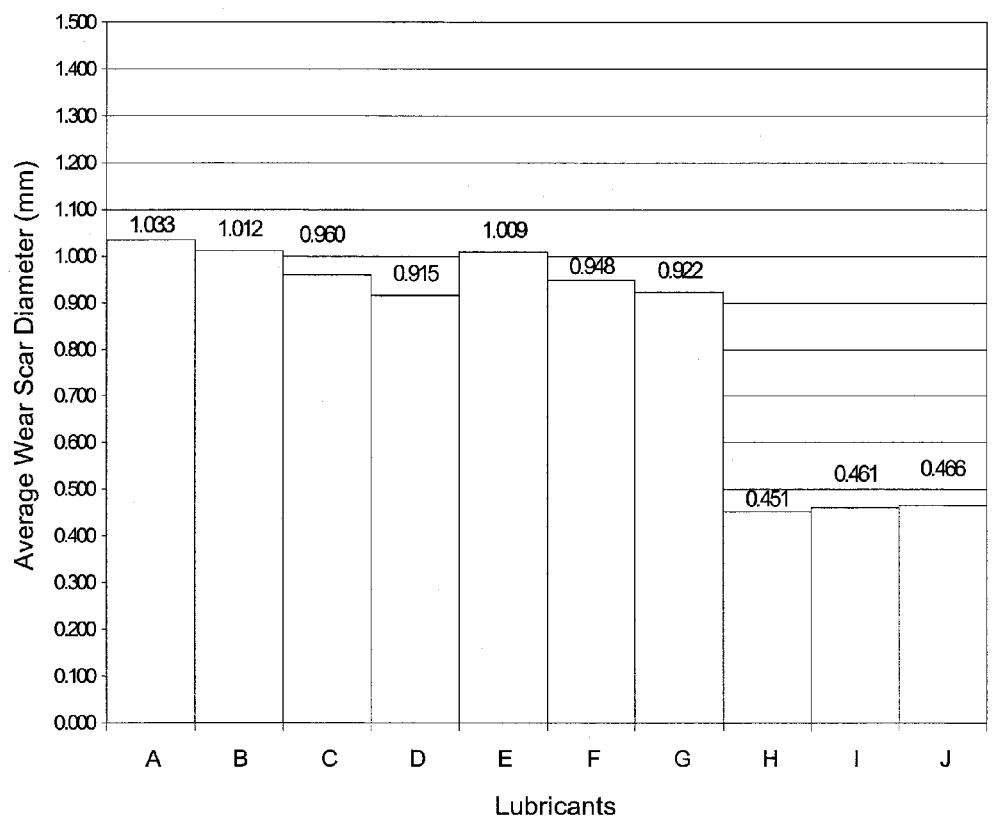
FIGS. 6(A)-6(D) show graphs and bar charts depicting tribological test data for different additives in paraffin oil.
Figure 6B:
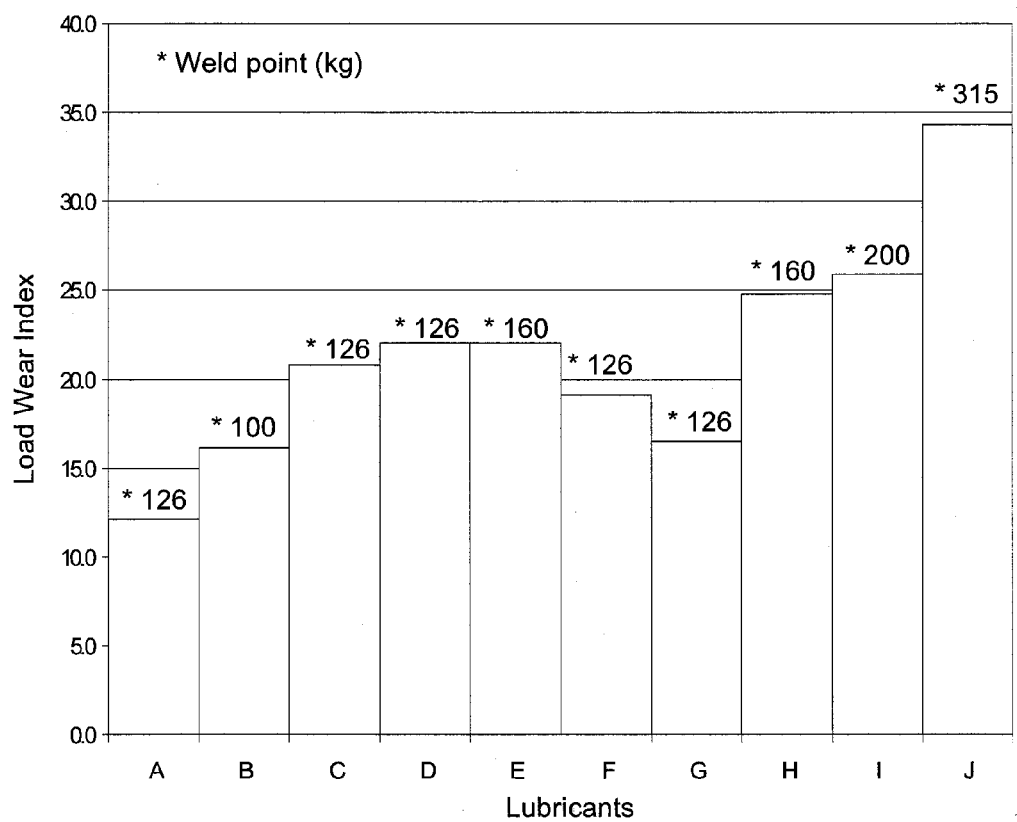
Figure 6C:
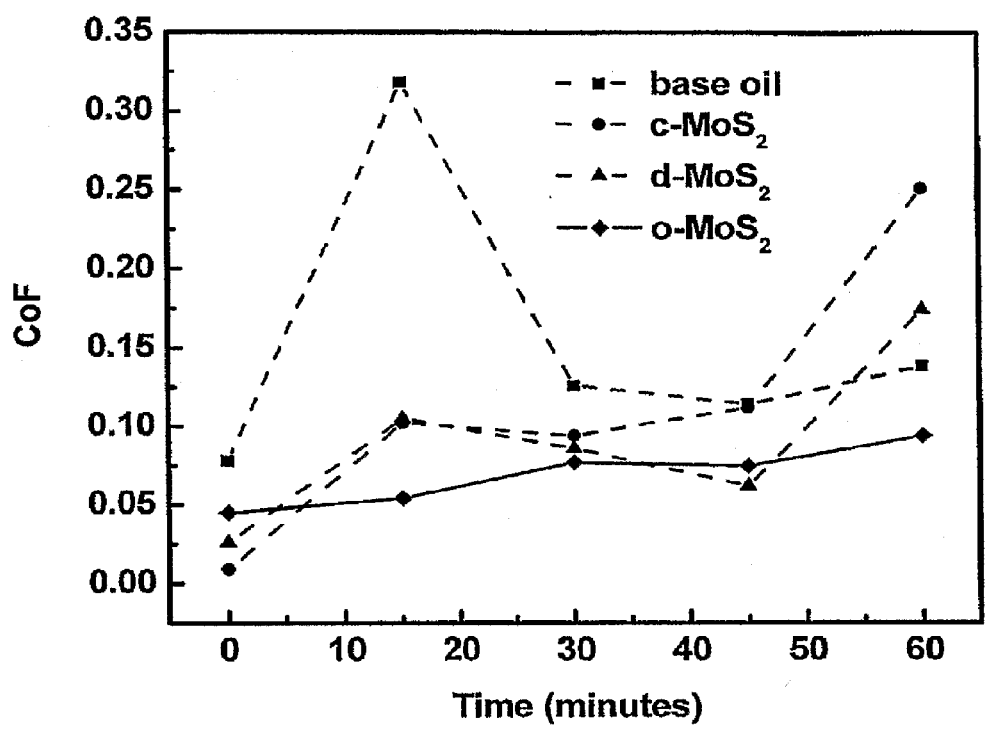
Figure 6D:
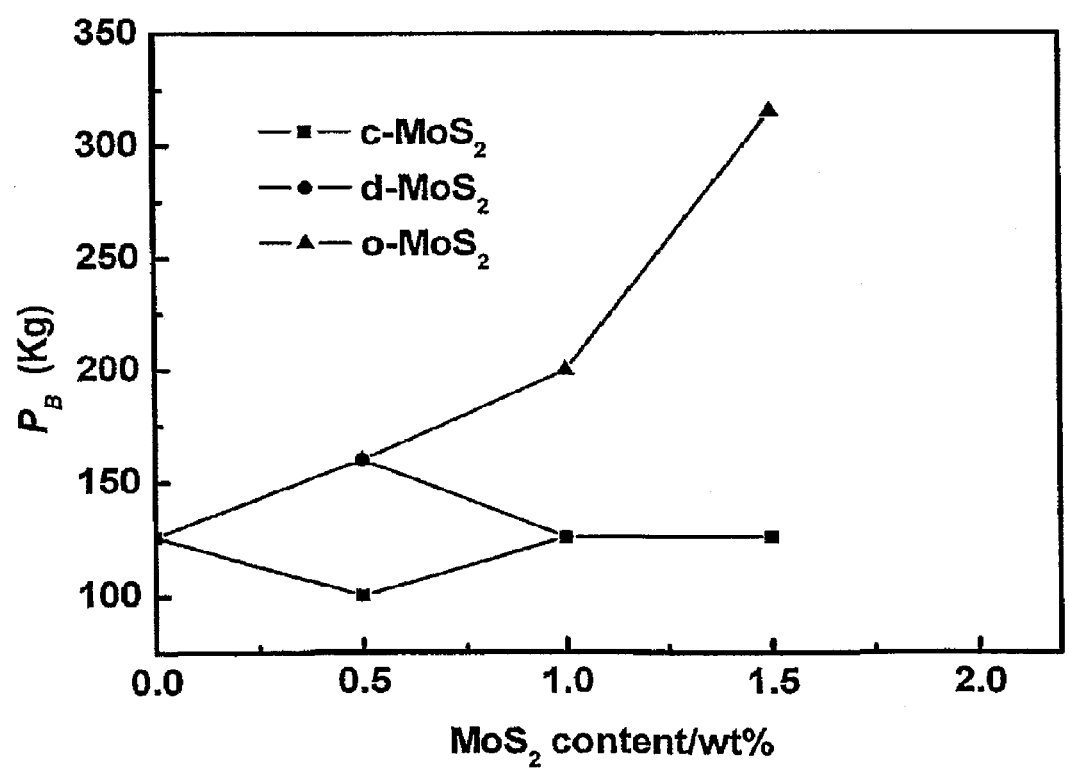

Three different particles (in w/w ratio) were evaluated for their anti-wear properties as additives in paraffin oil. FIG. 6(A) shows the average wear scar measurements for paraffin oil without a nanoparticle additive, paraffin oil with micron sized MoS$_2$, paraffin oil with MoS$_2$ that was milled in air for 48 hours, and paraffin oil with MoS$_2$ that was milled in air for 48 hours followed by milling in canola oil for 48 hours. FIG. 6(B) shows the load wear index for paraffin oil without a nanoparticle additive, paraffin oil with micron sized MoS$_2$, paraffin oil with MoS$_2$ that was milled in air for 48 hours, and paraffin oil with MoS$_2$ that was milled in air for 48 hours followed by milling in canola oil for 48 hours. FIG. 6(C) shows the COF for paraffin oil without a nanoparticle additive, paraffin oil with micron sized MoS$_2$, paraffin oil with MoS$_2$ that was milled in air for 48 hours, and paraffin oil with MoS$_2$ that was milled in air for 48 hours followed by milling in canola oil for 48 hours. FIG. 6(D) shows the extreme pressure data for paraffin oil with micron sized MoS$_2$, paraffin oil with MoS$_2$ that was milled in air for 48 hours, and paraffin oil with MoS$_2$ that was milled in air for 48 hours followed by milling in canola oil for 48 hours. In each test the nanoparticle additive was present in the amount of 1% by weight.

Test data from nanoparticle composition additive in base oil

| Lubricant All dispersions diluted to x % by wt. in reference base oil | Four Ball Tests at 40 kg Load (ASTM D4172) WSD (mm) | COF | Four Ball Extreme Pressure (ASTM D-2783) Weld Load (kg) | Load Wear Index | FIG. 6(A) and 6(b) |
|---|---|---|---|---|---|
| Paraffin oil | 1.033 | 0.155 | 126 | 12.1 | A |
| Nanoparticles of MoS$_2$ without organic medium (0.5%) | 1.012 | 0.102 | 100 | 16.1 | B |
| Nanoparticles of MoS$_2$ without organic medium (1.0%) | 0.960 | 0.114 | 126 | 20.8 | C |
| Nanoparticles of MoS$_2$ without organic medium (1.5%) | 0.915 | 0.098 | 126 | 22.0 | D |
| Conventional available micro particles (0.5%) | 1.009 | 0.126 | 160 | 22.0 | E |
| Conventional available micro particles (1.0%) | 0.948 | 0.091 | 126 | 19.1 | F |
| Conventional available micro particles (1.5%) | 0.922 | 0.106 | 126 | 16.5 | G |
| NanoGlide: Nanoparticles of MoS$_2$ with organic medium (0.5%) | 0.451 | 0.077 | 160 | 24.8 | H |
| NanoGlide: Nanoparticles of MoS$_2$ with organic medium (1.0%) | 0.461 | 0.069 | 200 | 25.9 | I |
| NanoGlide: Nanoparticles of MoS$_2$ with organic medium (1.5%) | 0.466 | 0.075 | 315 | 34.3 | J |

Figure 9:
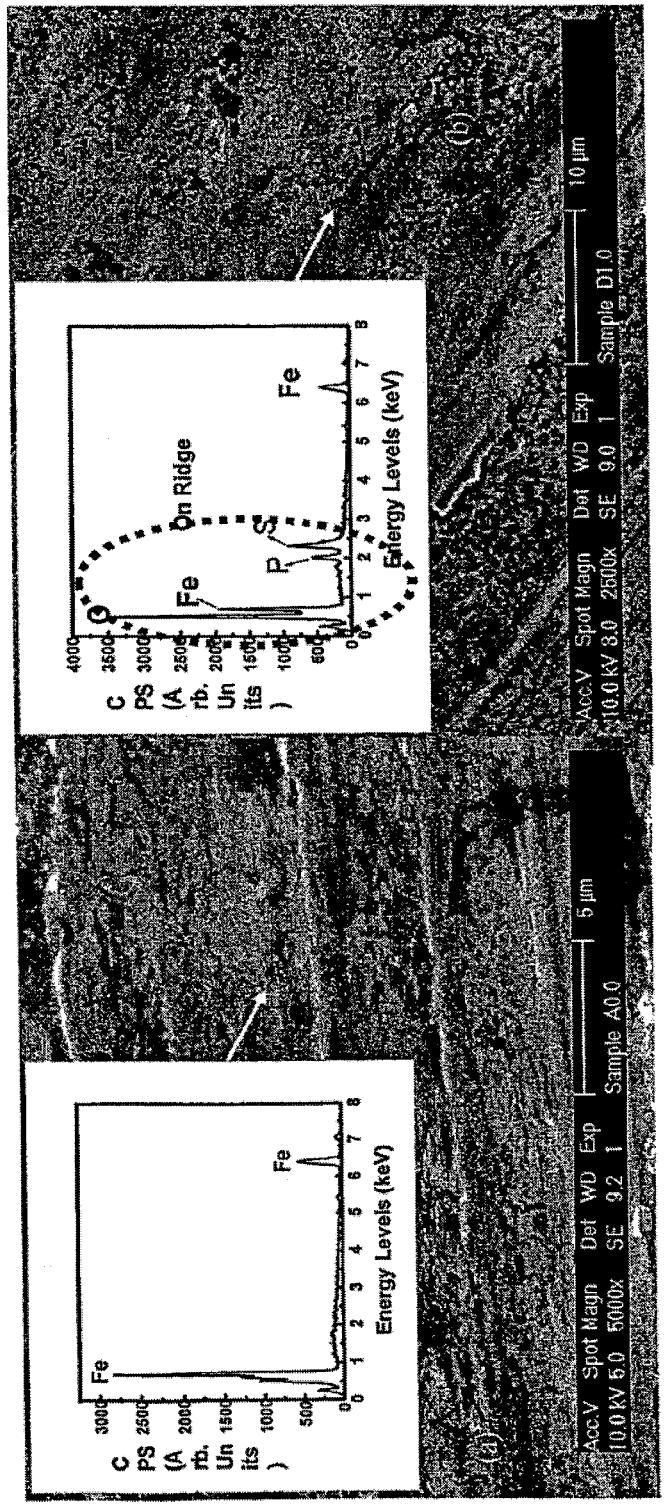
FIG. 9 shows photographs and graphs produced using energy dispersive x-ray analysis (EDS) depicting the chemical analysis of wear scar diameters in four-ball tribological testing for nanoparticle based lubricants.

The transfer film in the wear scar, studied using energy dispersive x-ray analysis (EDS), identified the signatures of phosphates in addition to molybdenum and sulfur. FIG. 9(a) depicts the base case of paraffin oil without a nanoparticle additive. FIG. 9(b) depicts paraffin oil with the molybdenum disulfide nanoparticles and the emulsifier. It shows the early evidences of molybdenum (Mo)-sulfur (S)-phosphorous (P) in the wear track. Iron (Fe) is seen in FIGS. 9(a) and 9(b), as it is the material of the balls (52100 steel) in the four-ball test. The molybdenum and sulfur peaks coincide and are not distinguishable because they have the same binding energy. Elemental mapping also showed similar results.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. In this manner, Applicant reserves the right to amend the claims during prosecution to add features as variously described in this specification, and such amendments comply with the requirements of 35 U.S.C. §§112(a) and 132(a).

What is claimed is:

1. A composition comprising:
   a plurality of nanoparticles having open architecture;
   a plurality of multifunctional nano-sheets; and
   an organic medium intercalated in the nanoparticles.

2. The composition of claim 1, wherein the plurality of nanoparticles and the plurality of nano-sheets independently comprise a material(selected from the group consisting of molybdenum disulfide, tungsten disulfide, niobium diselenide, graphite, hexagonal boron nitride, copper, calcium carbonate, polytetrafluoroethylene, dithiophosphate compounds, and combinations of any thereof.

3. The composition of claim 1, wherein the nano-sheets are functionalized with organic functional groups or molecules.

4. The composition of claim 1, wherein the nano-sheets are functionalized with inorganic functional groups or molecules.

5. The composition of claim 1, wherein the nano-sheets are functionalized with a catalyst.

6. The composition of claim 1, wherein the nano-sheets are functionalized with a dispersant agent.

7. The composition of claim 6, wherein the dispersant agent comprises at least one material selected from the group consisting of amide compounds, borate compounds, and boride compounds.

8. The composition of claim 6, wherein the dispersant agent comprises at least one of succinimide and disodium octaborate tetrahydrate.

9. The composition of claim 1 wherein the nano-sheets are functionalized with an anti-corrosion agent.

10. The composition of claim 9, wherein the anticorrosion agent comprises at least one material selected from the group consisting of alkaline earth metal bisalkylphenolsulphonates, dithiophosphates, alkenylsuccinic acid half-amides, and combinations thereof.

11. The composition of claim 1, wherein the nano-sheets are functionalized with a biocidal agent.

12. The composition of claim 11, wherein the biocidal agent comprises at least one material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

13. The composition of claim 1, wherein the nano-sheets are functionalized with an antioxidant.

14. The composition of claim 13, wherein the antioxidant comprises at least one material selected from the group consisting of hindered phenols, alkylated phenols, alkyl amines, aryl amines, 2,6-di-tert-butyl-4-methylphenol, 4,4'-di-tert-octyldiphenylamine, tent-butyl hydroquinone, tris(2, 4-di-tert-butylpheny)phosphate, phosphites, thioesters, and combinations of any thereof.

15. The composition of claim 1, wherein the nano-sheets comprise graphene nano-sheets, and wherein the nanoparticles comprise graphite nanoparticles.

16. The composition of claim 1, wherein the nano-sheets comprise molybdenum disulfide nano-sheets, and wherein the nanoparticles comprise molybdenum disulfide nanoparticles.

17. The composition of claim 1, wherein the nano-sheets comprise tungsten disulfide nano-sheets, and wherein the nanoparticles comprise tungsten disulfide nanoparticles.

18. The composition of claim 1, wherein the nano-sheets comprise hexagonal boron nitride nano-sheets, and wherein the nanoparticles comprise hexagonal boron nitride nanoparticles.

19. The composition of claim 1, wherein the organic medium comprises at least one material selected from the group consisting of oil media, grease media, alcohol media, composite oils, mineral oils, synthetic oils, canola oil, vegetable oil, soybean oil, corn oil, rapeseed oil, ethyl and methyl esters of rapeseed oil, monoglycerides, distill monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, lecithins, dithiophosphate compounds, amide compounds, boron-containing compounds, and combinations of any thereof.

20. The composition of claim 1, wherein the organic medium comprises an oil medium selected from the group consisting of a composite oil, a mineral oil, a synthetic oils, canola oil, vegetable oil, soybean oil, corn oil, a hydrocarbon oil, a mineral oil, and combinations of any thereof.

21. The composition of claim 1 wherein the nanoparticles are encapsulated with the organic medium.

22. The composition of claim 1, wherein the nanoparticles have an average particle size of less than or equal to about 500 nm.

23. The composition of claim 1, further comprising a base lubricant material that is different than the organic medium, wherein the nano-sheets and the intercalated nanoparticles are dispersed in the base lubricant material.

24. The composition of claim 23, wherein the base lubricant material comprises at least one material selected from the group consisting of an oil, a grease, a plastic, a gel, a wax, a silicone, a hydrocarbon oil, a vegetable oil, corn oil, peanut oil, canola oil, soybean oil, a mineral oil, a paraffin oil, a synthetic oil, a petroleum gel, a petroleum grease, a hydrocarbon gel, a hydrocarbon grease, a lithium based grease, a fluoroether based grease, ethylenebistearamide, and combinations of any thereof.

25. The composition of claim 23, wherein the base lubricant material comprises at least one material selected from the group consisting of an oil, a grease, a plastic, a gel, a wax, a silicone, and combinations of any thereof.

26. The composition of claim 23, wherein the base lubricant material comprises an oil or a grease.

27. The composition of claim 26, wherein the base lubricant material comprises at least one material selected from the group consisting of a mineral oil, a paraffin oil, a synthetic oil, a petroleum grease, a hydrocarbon grease, a lithium based grease, and combinations of any thereof.

28. The composition of claim 1, thither comprising an emulsifier.

29. The composition of claim 28, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

30. The composition of claim 28, wherein the emulsifier comprises a compound containing phosphorous.

31. The composition of claim 28, wherein the emulsifier comprises a phospholipid.

32. The composition of claim 28, wherein the emulsifier comprises a lecithin.

33. The composition of claim 1, further comprising a surfactant.

34. The composition of claim 33, wherein the surfactant comprises at least one material selected from the group consisting of 2-alkyl-succinic acid 1-propyl ester, canola oil, dialkyl hydrogen phosphite, glycerol mono oleate, lecithin, octadecylamine, oleic acid, oleylamide, oleylamine, poly (methyl methacrylate), sodium stearate, Span 80, stearic acid, thiocarbamates (molybdenum dithiocarbamate or MoDTC), thiophosphates (molybdenum dithiophosphate or MoDTP, zinc dialkyl dithiophosphate or ZDDP), trioctylphosphine oxide, Tween 20, and combinations of any thereof.

35. The composition of claim 1, further comprising a dispersant.

36. The composition of claim 35, wherein the dispersant comprises at least one material selected from the group consisting of polyisobutylene succinimides (PIBS) succinic anhydrides, PIBS anhydrides, succiniate esters, metal sulfbnates, polymeric detergents, polymeric dispersants, polyoxyethylene alkyl ethers, polyoxyethylene dialkylphenol ethers, polyalphaolefins (PAO), alkylglycoside, polyoxyethylene fatty acid esters, sucrose fatty acid esters, sorbitan fatty acid esters, polyoxyethylene sorbitan fatty acid esters, borate esters, phosphate esters, phosphate amines, fatty acid alkanolamide, and combinations of any thereof.

37. The composition of claim 35, wherein the dispersant comprises an amine-containing compound comprising a reaction product of an amine selected from the group consisting of ethylenediamine, diethylenetriamine, pentaethylenehexamine, polyethyleneamine, tetraethylenepentamine, triethylenetetramine, and combinations of any thereof.

38. A lubricant comprising the composition of claim 1.

39. A method comprising:
contacting a surface of an object with a composition comprising:
a plurality of nanoparticles having open architecture; and
an organic medium intercalated in the nanoparticles;
subjecting the surface and the contacting composition to at least one of friction, pressure, or mechanical stress; and
delaminating constituent layers of the nanoparticles to form a plurality of multifunctional nano-sheets; wherein the nano-sheets deposit on the surface in a tribo-film.

40. The method of claim 39, wherein the plurality of nanoparticles and the plurality of nano-sheets comprise a material selected from the group consisting of molybdenum disulfide, tungsten disulfide, niobium diselenide, graphite, hexagonal boron nitride, copper, calcium carbonate, polytetrafluoroethylene, dithiophosphate compounds, and combinations of any thereof.

41. The method of claim 39, wherein the nano-sheets are functionalized with organic functional groups or molecules.

42. The method of claim 39, wherein the nano-sheets are functionalized with inorganic functional groups or molecules.

43. The method of claim 39, wherein the nano-sheets are functionalized with catalysts.

44. The method of claim 39, wherein the nano-sheets are functionalized with a dispersant agent.

45. The method of claim 44, wherein the dispersant agent comprises at least one material selected from the group consisting of amide compounds, borate compounds, and boride compounds.

46. The method of claim 44, wherein the dispersant, agent comprises at least one of succinimide and disodium octaborate tetrahydrate.

47. The method of claim 39, wherein the nano-sheets are functionalized with an anti-corrosion agent.

48. The method of claim 47, wherein the anticorrosion agent comprises at least one material selected from the group consisting of alkaline earth metal bisalkylphenolsulphonates, dithiophosphates, alkenylsuccinic acid halfamides, and combinations thereof.

49. The method of claim 39, wherein the nano-sheets are functionalized with a biocidal agent.

50. The method of claim 49, wherein the biocidal agent comprises at least one material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

51. The method of claim 39, wherein the nano-sheets are functionalized with an antioxidant.

52. The method of claim 51, wherein the antioxidant comprises at least one material selected from the group consisting of hindered phenols, alkylated phenols, alkyl amines, aryl amines, 2,6-di-tent-butyl-4-methylphenol, 4,4'-di-tert-octyldiphenylamine, tert-butyl hydroquinone, tris(2, 4-di-tert-butylphenyl)phosphate, phosphites, thioesters, and combinations of any thereof.

53. The method of claim 39, wherein the nano-sheets comprise graphene nano-sheets, and wherein the nanoparticles comprise graphite nanoparticles.

54. The method of claim 39, wherein the nano-sheets comprise molybdenum disulfide nano-sheets, and wherein the nanoparticles comprise molybdenum disulfide nanoparticles.

55. The method of claim 39, wherein the nano-sheets comprise tungsten disulfide nano-sheets, and wherein the nanoparticles comprise tungsten disulfide nanoparticles.

56. The method of claim 39, wherein the nano-sheets comprise hexagonal boron nitride nano-sheets, and wherein the nanoparticles comprise hexagonal boron nitride nanoparticles.

57. The method of claim 39, wherein the organic medium comprises at least one material selected from the group consisting of oil media, grease media, alcohol media, composite oils, mineral oils, synthetic oils, canola oil, vegetable oil, soybean oil, corn oil, rapeseed oil, ethyl and methyl esters of rapeseed oil, monoglycerides, distilled monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, lecithins, dithiophosphate compounds, amide compounds, boron-containing compounds, and combinations of any thereof.

58. The method of claim 39, wherein the organic medium comprises an oil medium selected from the group consisting of a composite oil, a mineral oil, a synthetic oils, canola oil, vegetable oil, soybean oil, corn oil, a hydrocarbon oil, a mineral oil, and combinations of any thereof.

59. The method of claim 39, wherein the nanoparticles are encapsulated with the organic medium.

60. The method of claim 39. wherein the nanoparticles have an average particle size of less than or equal to about 500 nm.

61. The method of claim 39, further comprising a base lubricant material that is different than the organic medium, wherein the nano-sheets and the nanoparticles are dispersed in the base lubricant material.

62. The method of claim 61, wherein the base lubricant material comprises at least one material selected from the group consisting of an oil, a grease, a plastic, a gel, a wax, a silicone, a hydrocarbon oil, a vegetable oil, corn oil, peanut oil, canola oil, soybean oil, a mineral oil, a paraffin oil, a synthetic oil, a petroleum gel, a petroleum grease, a hydrocarbon gel, a hydrocarbon grease, a lithium based grease, a fluoroether based grease, ethylenebistearamide, and combinations of any thereof.

63. The method of claim 61, wherein the base lubricant material comprises at least one material selected from the group consisting of an oil, a grease, a plastic, a gel, a wax, a silicone, and combinations of any thereof.

64. The method of claim 61, wherein the base lubricant material comprises an oil or a grease.

65. The method of claim 64, wherein the base lubricant material comprises at least one material selected from the group consisting of a mineral oil, a paraffin oil, a synthetic oil, a petroleum grease, a hydrocarbon grease, a lithium based grease, and combinations of any thereof.

\* \* \* \* \*